(12) United States Patent
Bich

(10) Patent No.: US 8,382,017 B2
(45) Date of Patent: Feb. 26, 2013

(54) GRINDING SYSTEM, GRINDING MILL FOR SUCH GRINDING SYSTEM, RELOAD CARTRIDGE FOR SUCH GRINDING SYSTEM, METHOD FOR DISTRIBUTING MATERIAL TO BE GROUND, METHOD FOR SELLING THE SAME AND METHOD FOR GRINDING THE SAME

(75) Inventor: Francois Bich, Neuilly sur Seine (FR)

(73) Assignee: Francois Bich, Neuilly sur Seine (FR)

( * ) Notice: Subject to any disclaimer, the term of this patent is extended or adjusted under 35 U.S.C. 154(b) by 317 days.

(21) Appl. No.: 12/682,737

(22) PCT Filed: Dec. 20, 2007

(86) PCT No.: PCT/EP2007/064369
§ 371 (c)(1),
(2), (4) Date: Jul. 20, 2010

(87) PCT Pub. No.: WO2009/046771
PCT Pub. Date: Apr. 16, 2009

(65) Prior Publication Data
US 2010/0308141 A1     Dec. 9, 2010

(30) Foreign Application Priority Data

Oct. 12, 2007    (WO) .................. PCT/IB2007/055372

(51) Int. Cl.
*A47J 42/04* (2006.01)
(52) U.S. Cl. .......................... 241/30; 241/36; 241/169.1
(58) Field of Classification Search .................... 241/30, 241/36, 168–169.1
See application file for complete search history.

(56) References Cited

U.S. PATENT DOCUMENTS

| | | |
|---|---|---|
| 3,055,599 A | 9/1962 | Cowles et al. |
| 3,136,491 A | 6/1964 | Posmanter |
| 3,168,256 A | 2/1965 | Bounds et al. |
| 3,371,874 A | 3/1968 | Reeves et al. |
| 3,470,812 A | 10/1969 | Levinson |
| 3,991,947 A | 11/1976 | Schlessel |
| 4,135,672 A | 1/1979 | Schlessel |
| 4,374,574 A | 2/1983 | David |
| 4,697,749 A | 10/1987 | Holcomb et al. |
| 4,771,954 A | 9/1988 | Poncy |
| 4,960,246 A | 10/1990 | Fohrman |
| 5,007,592 A | 4/1991 | Poncy |
| 5,022,591 A | 6/1991 | Sanders |
| 5,176,329 A | 1/1993 | De Coster et al. |
| 5,180,114 A | 1/1993 | Chen |
| 5,244,159 A | 9/1993 | Newnan |
| 5,651,506 A | 7/1997 | Hockey |
| 5,865,384 A | 2/1999 | Pai |
| 6,056,217 A | 5/2000 | Friden |

(Continued)

FOREIGN PATENT DOCUMENTS

| | | |
|---|---|---|
| DE | 3303960 | 6/1984 |
| DE | 20304793 | 3/2003 |

(Continued)

*Primary Examiner* — Mark Rosenbaum
(74) *Attorney, Agent, or Firm* — McDonnell Boehnen Hulbert & Berghoff LLP

(57) ABSTRACT

Grinding system (1) comprising a grinding mill (2) and a reload cartridge (3) containing a material to be ground (37) and adapted to be removably mounted on the grinding mill. The cartridge has a closure member (33) which is opened by an opening member (18) of the grinding mill when the cartridge is coupled to the grinding mill.

20 Claims, 32 Drawing Sheets

U.S. PATENT DOCUMENTS

| | | |
|---|---|---|
| 6,164,574 A | 12/2000 | Weibel |
| 6,224,005 B1 | 5/2001 | Wu |
| 6,247,661 B1 | 6/2001 | Chainani |
| 6,409,109 B1 | 6/2002 | Wu |
| 6,443,377 B1 | 9/2002 | Cheng |
| 6,655,616 B1 | 12/2003 | Wagner |
| 6,663,031 B2 | 12/2003 | Henderson et al. |
| 6,672,524 B1 | 1/2004 | Holcomb et al. |
| 6,830,206 B2 | 12/2004 | Yang |
| 6,854,675 B2 | 2/2005 | Wong |
| 6,929,201 B1 | 8/2005 | Blouse et al. |
| 7,007,875 B2 | 3/2006 | Cheng |
| 7,048,216 B2 | 5/2006 | Ng |
| 7,100,496 B2 | 9/2006 | Majer Doglioni |
| 7,207,511 B2 | 4/2007 | Ng |
| 7,222,806 B2 | 5/2007 | Fornage |
| 2005/0274835 A1 | 12/2005 | Huang |
| 2006/0006262 A1 | 1/2006 | Gilberts |
| 2006/0130664 A1 | 6/2006 | Majer Doglioni |
| 2006/0261197 A1 | 11/2006 | Chan et al. |
| 2006/0278746 A1 | 12/2006 | Delbridge et al. |
| 2007/0063079 A1 | 3/2007 | Ford |

FOREIGN PATENT DOCUMENTS

| | | |
|---|---|---|
| DE | 20203080 U | 3/2004 |
| DE | 20300928 | 5/2004 |
| DE | 202005010855 | 12/2005 |
| DE | 102005032166 | 1/2007 |
| EP | 0201161 | 11/1986 |
| EP | 0302131 | 2/1989 |
| EP | 1741373 | 1/2007 |
| EP | 0278234 | 8/2010 |
| EP | 1243210 | 8/2010 |
| FR | 1010335 | 6/1952 |
| FR | 2173961 | 10/1973 |
| FR | 2388533 | 11/1978 |
| FR | 2424012 | 11/1979 |
| GB | 1158128 | 7/1969 |
| GB | 1256247 | 12/1971 |
| JP | 2004073533 | 3/2004 |
| WO | 89/01753 | 3/1989 |
| WO | 2007080532 | 7/2007 |

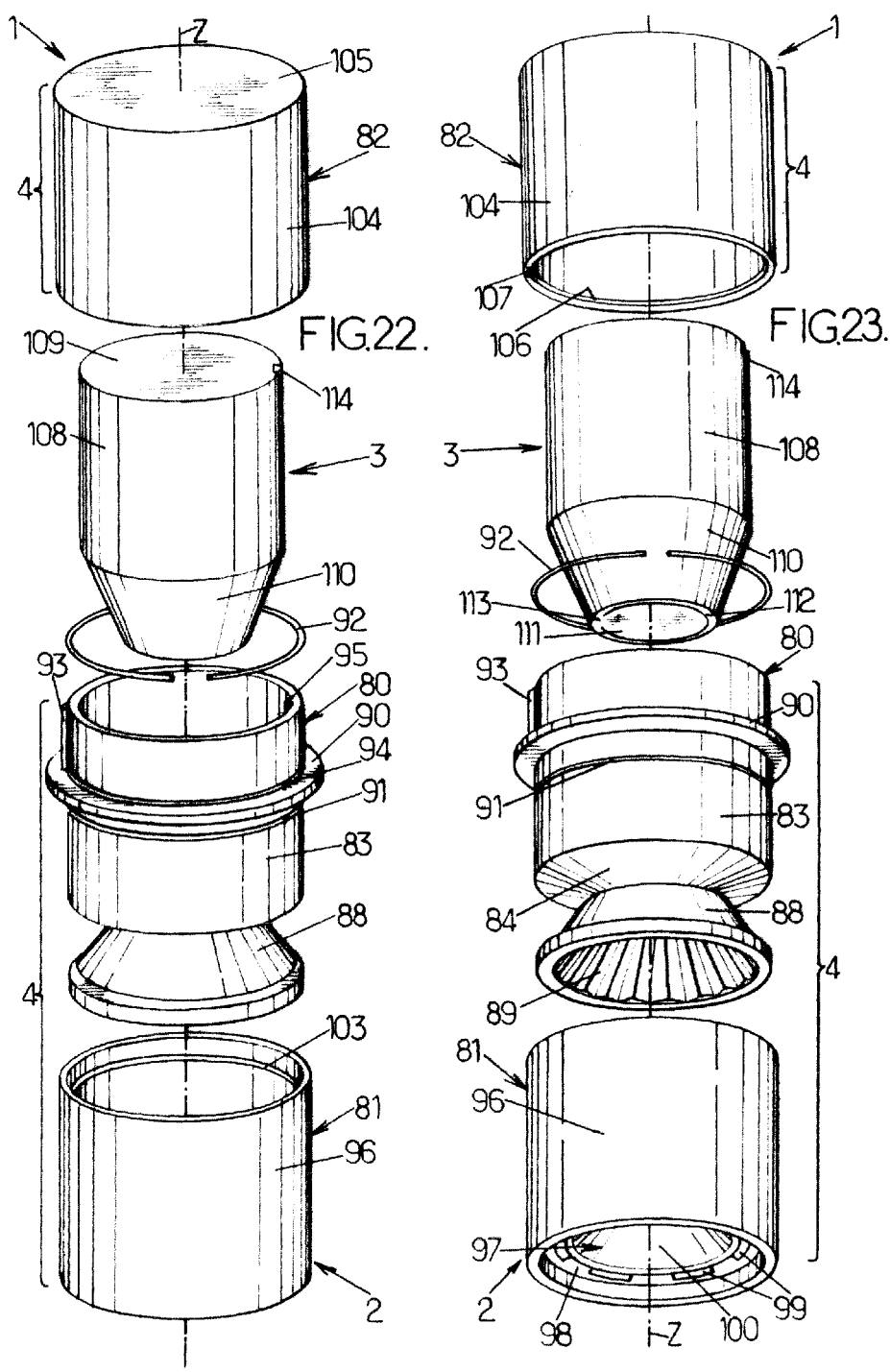

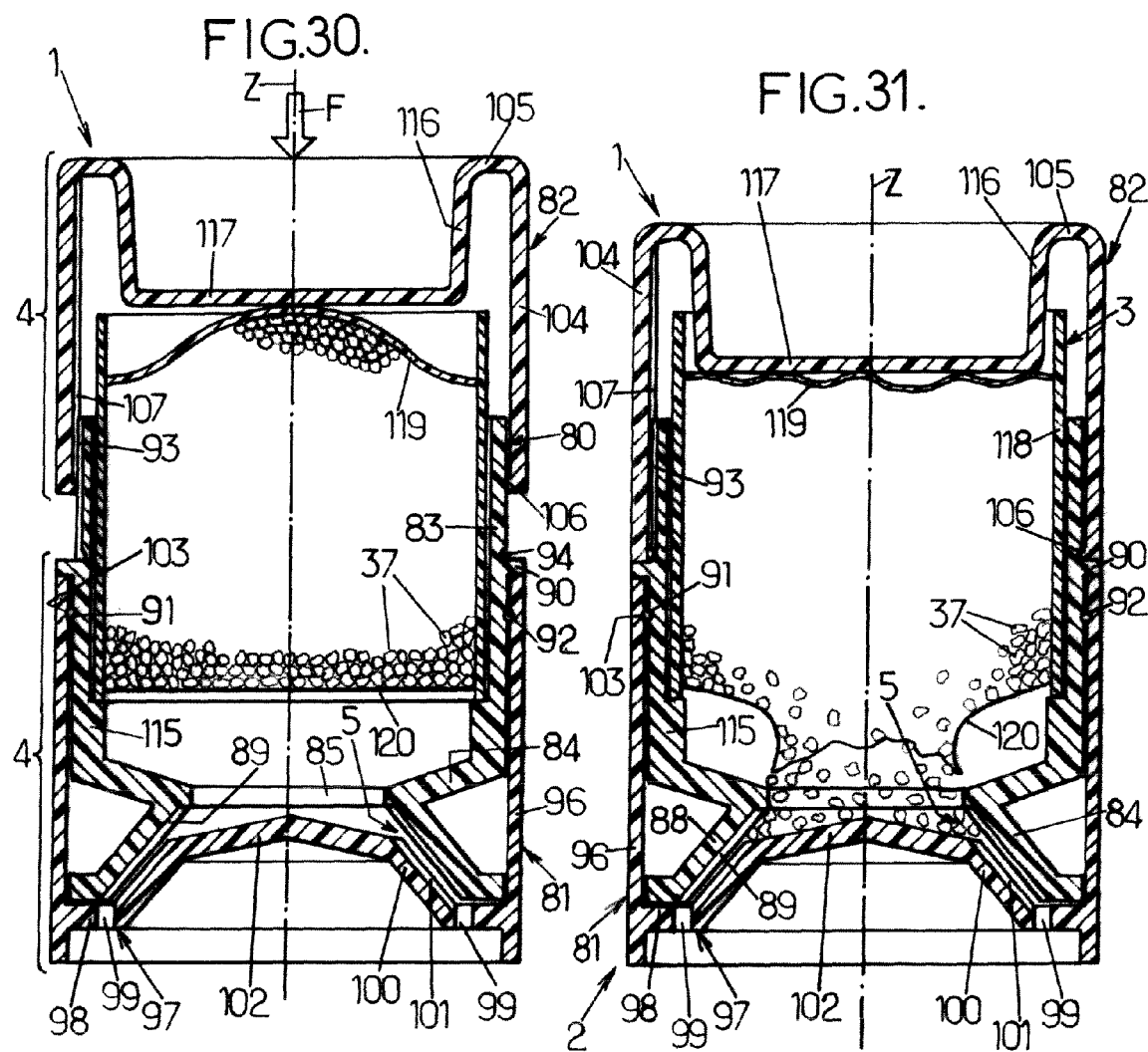

FIG.32.
FIG.33.
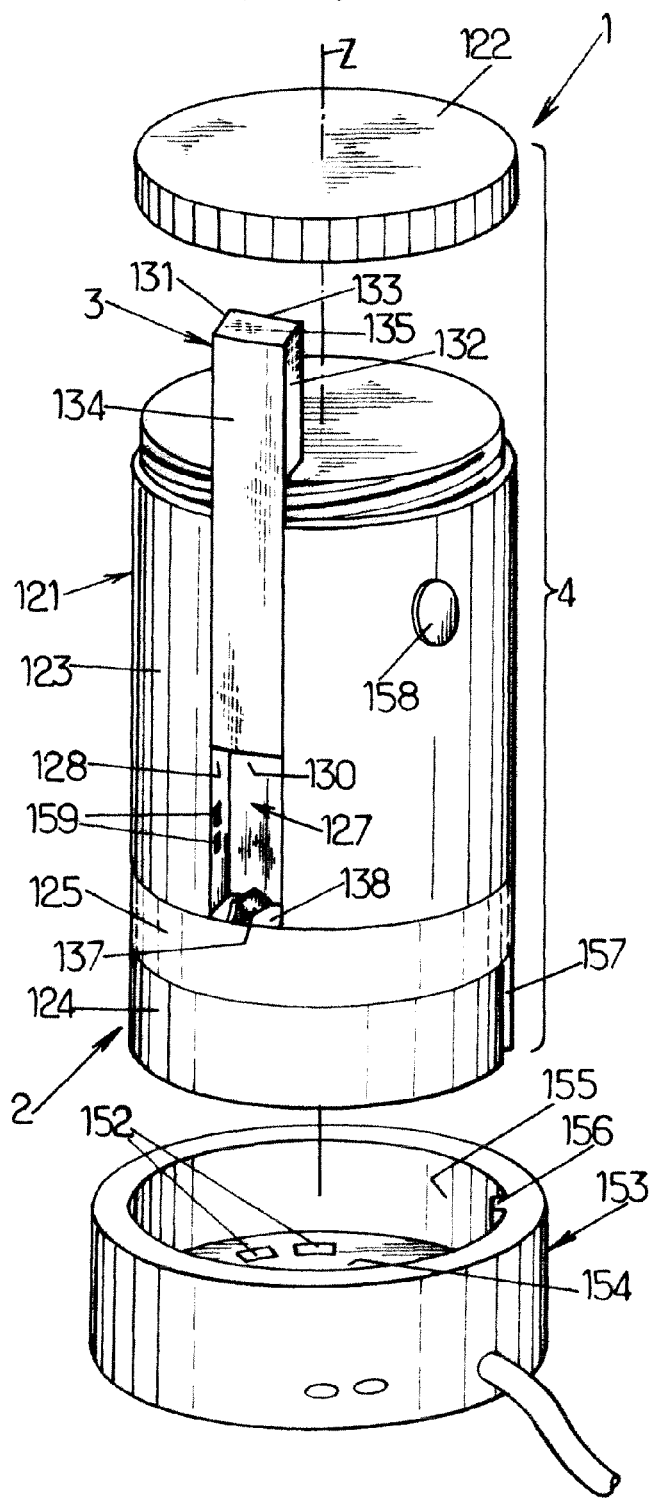
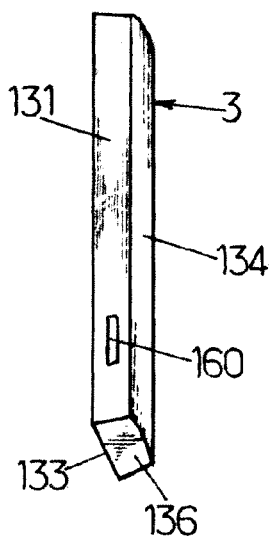

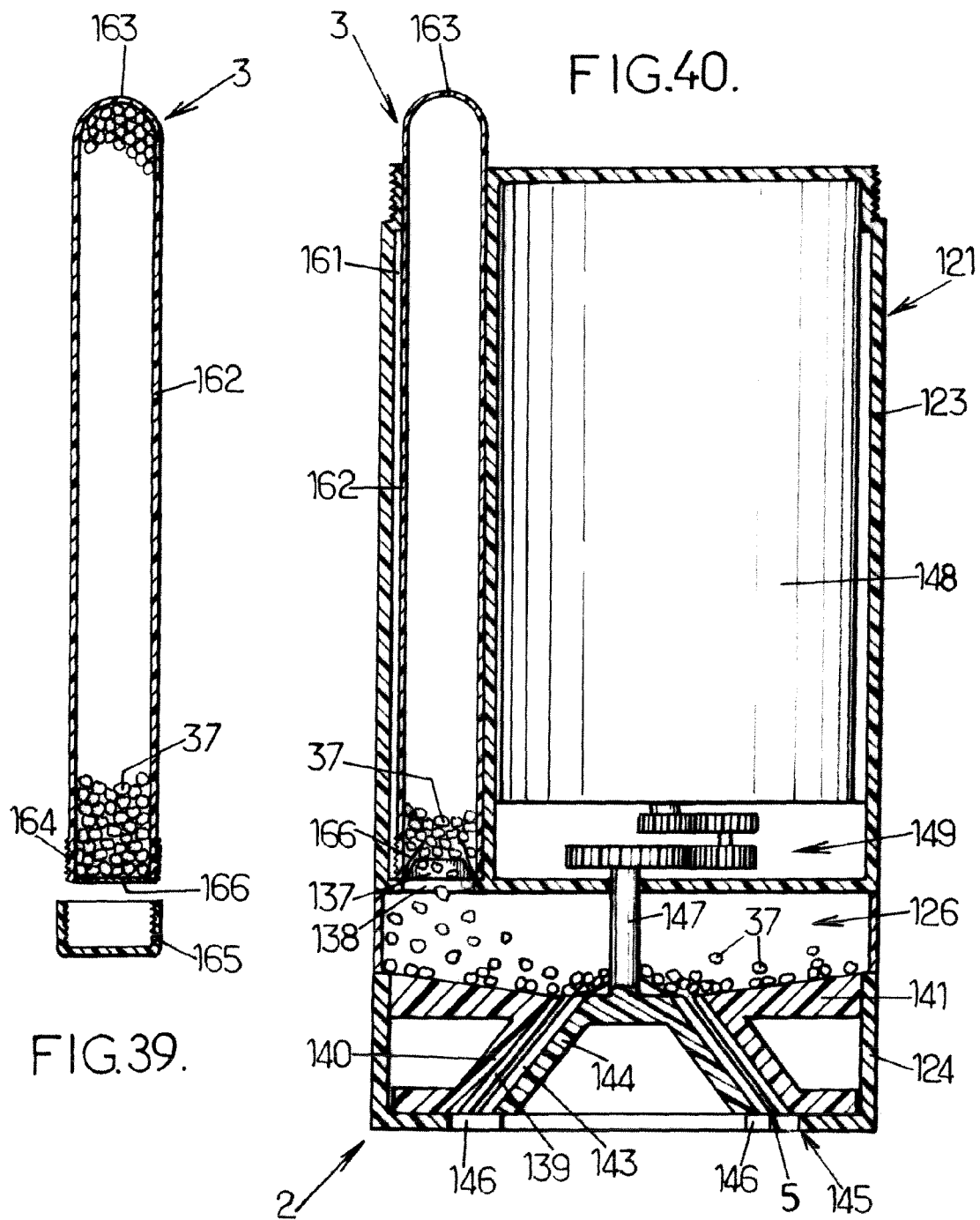

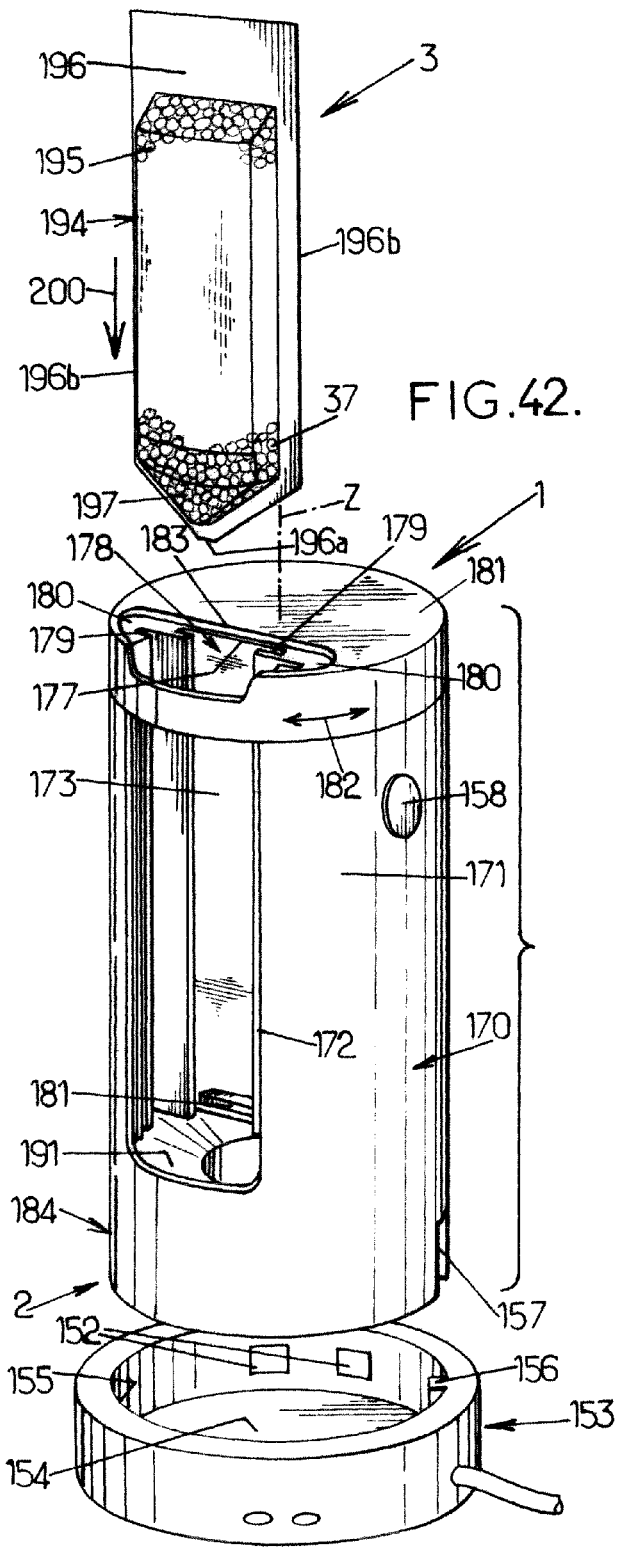

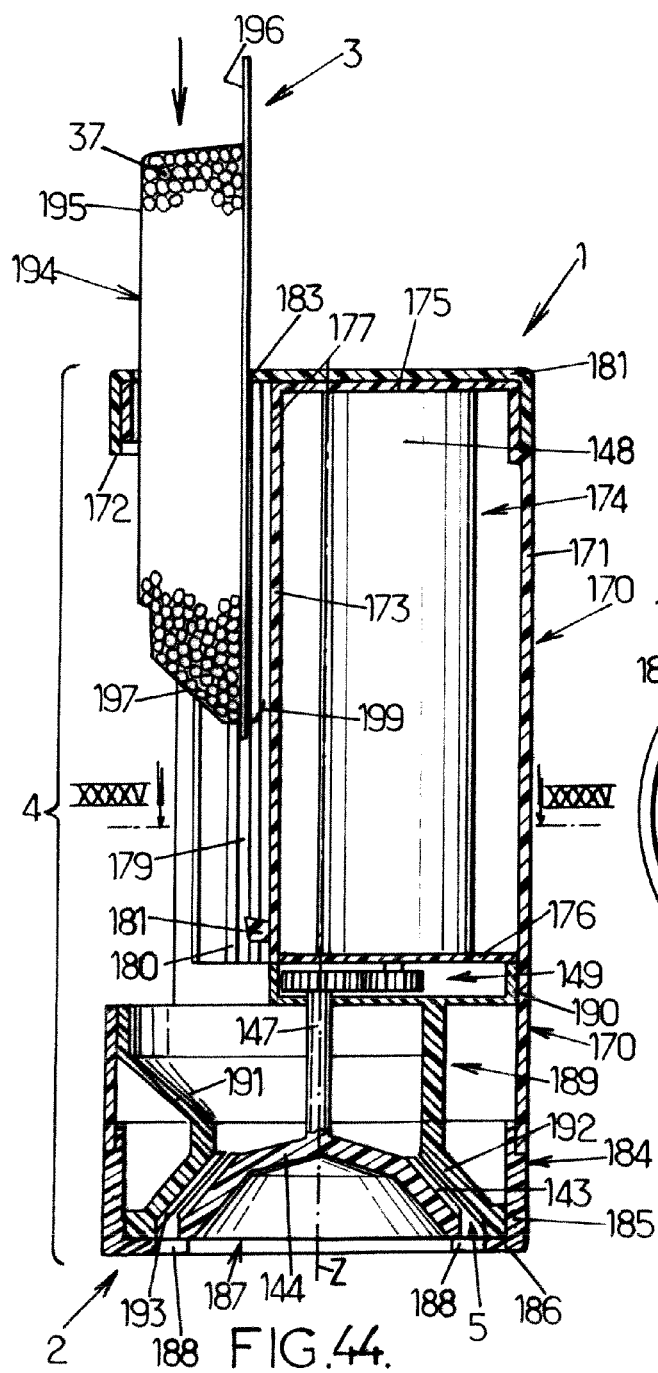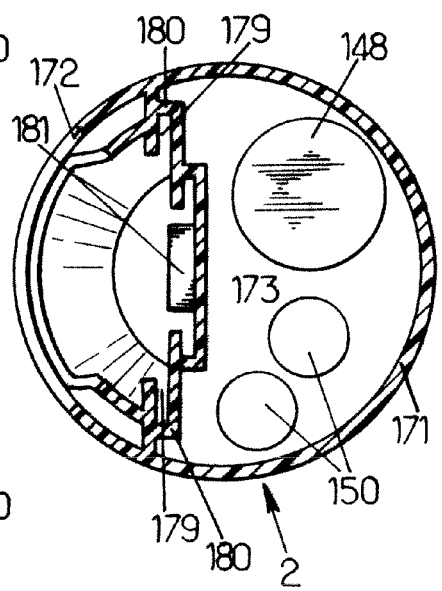

US 8,382,017 B2

GRINDING SYSTEM, GRINDING MILL FOR SUCH GRINDING SYSTEM, RELOAD CARTRIDGE FOR SUCH GRINDING SYSTEM, METHOD FOR DISTRIBUTING MATERIAL TO BE GROUND, METHOD FOR SELLING THE SAME AND METHOD FOR GRINDING THE SAME

FIELD OF THE INVENTION

The invention relates to grinding systems, to grinding mills for such grinding systems and to reload cartridges for such grinding systems.

BACKGROUND OF THE INVENTION

More precisely, the invention relates to a grinding system comprising:
- a grinding mill including a housing and a grinding mechanism which is mounted in said housing and which is adapted to grind particles of a material,
- a reload cartridge adapted to be removably coupled to said grinding mill, said cartridge defining an internal volume which is adapted to contain said material to be ground, said cartridge having at least one closure member which is adapted to close said internal volume before said cartridge is coupled to said grinding mill and to open toward said grinding mechanism when said cartridge is coupled to said grinding mill.

Document US-A-2006/006262 discloses an example of such a known grinding system, in which the closure member has to be manually moved between an open position and a closed position, which complicates the use of the grinding system. In particular, a user may unsuccessfully try to grind material with the grinding mill if the closure member of the cartridge is in the closed position.

OBJECTS AND SUMMARY OF THE INVENTION

One objective of the present invention is to propose a grinding system in which the closure member of the cartridge automatically opens when coupling the cartridge to the grinding mill.

To this end, according to an embodiment of the invention, in a grinding system of the type in question, the grinding mill includes an opening member which is adapted to open said closure member when said cartridge is coupled to the grinding mill.

Thanks to these dispositions, the opening of the closure member is done automatically when coupling the cartridge to the grinding mill, and the use of the grinding system—specially the coupling of a new cartridge to the grinding mill—is therefore very simple for a user.

In various embodiments of the grinding system according to the above embodiment of the invention, one may possibly have recourse in addition to one and/or other of the following arrangements:
- the opening member is adapted to interfere with said closure member to open said closure member when said cartridge is coupled to the grinding mill;
- the opening member is adapted to maintain the closure member in open position as long as the cartridge remains coupled to the grinding mill;
- the closure member is such that opening of said closure member is irreversible;
- the cartridge is adapted to be coupled to the grinding mill following a certain coupling movement, and the opening member is adapted to open the closure member when the cartridge follows said coupling movement;
- the closure member is adapted to seal tightly the cartridge (which enables to keep the material to be ground in optimum conditions, for instance under a predetermined hygrometry, under a predetermined pressure or under an atmosphere having a predetermined composition);
- the closure member is at least partially frangible and said opening member is adapted to break said closure member when said cartridge is coupled to the grinding mill;
- the closure member is attached to an external wall belonging to the cartridge before said cartridge is coupled for the first time to the grinding mill, said closure member having a periphery which is connected to said external wall by at least one frangible bridge;
- said periphery of the closure member is further connected to said external wall by a hinge enabling the closure member to pivot relative to the external wall of the cartridge when said closure member is opened;
- the closure member is an elongate tongue extending longitudinally from said hinge;
- said periphery of the closure member is connected to said external wall solely by said frangible bridge;
- the closure member comprises a frangible membrane;
- the opening member protrudes from a portion of the grinding mill and said opening member is adapted to push on said closure member toward the internal volume of the cartridge and break said closure member when the cartridge is coupled to the grinding mill;
- the opening member is rigid with the housing (4) of the grinding mill;
- the opening member is a transmission shaft adapted to rotate a grinding wheel belonging to said grinding mechanism;
- the opening member is shaped for fitting with a coupling member which is connected to a peripheral wall belonging to the cartridge, said cartridge being adapted to be rotatably mounted on the housing of the grinding mill and said coupling member being able to drive said opening member and grinding wheel in rotation when said cartridge is rotated;
- the coupling member is in the internal volume of the cartridge and is rigid with the peripheral wall of the cartridge, the opening member being adapted to enter said internal volume and fit with said coupling member when said opening member opens the closure member;
- the coupling member is rigid with the closure member, the cartridge has a secondary coupling member which is in the internal volume of the cartridge and which is rigid with the peripheral wall of the cartridge, the opening member being adapted to push said closure member into said internal volume and have said coupling member fit with said secondary coupling member when the cartridge is coupled to the grinding mill;
- the cartridge is adapted to be snap fitted on the grinding mill;
- the cartridge is adapted to be screwed on the grinding mill by rotation around an axis of rotation, the cartridge has an end wall having at least one perforation and the closure member is pivotally mounted on said end wall around said axis of rotation, between a closed position wherein said closure member closes said perforation and an open position wherein said closure member opens said perforation, and the opening member is adapted to stop the closure member in rotation while the cartridge is being screwed on the grinding mill, so as to pivot the closure member toward the open position;

the housing of the grinding mill defines a recess adapted to receive the cartridge and said housing includes a removable cover which is adapted to close said recess.

the removable cover is adapted to push on the cartridge to open said closure member;

the removable cover is adapted to push the cartridge toward said opening member when coupling the cartridge to the grinding mill, said opening member protruding inside said recess and being in register with the closure member of the cartridge, so that said opening member exerts a pressure on said closure member and opens said closure member when the cartridge is coupled to the grinding mill;

the closure member of the cartridge is frangible and the cartridge further includes a deformable wall opposite said closure member, said opening member being adapted to push on said deformable wall of the cartridge so as to push toward said closure member, and the closure member being adapted to break under pressure when the opening member pushes on said deformable wall;

the housing of the grinding mill defines a recess adapted to receive the cartridge and said housing includes a removable cover which is adapted to close said recess, the opening member being movable with said cover;

the system further includes a driving mechanism connected to the grinding mechanism by a driving shaft, the cartridge being adapted to be interposed between said driving mechanism and the grinding mill;

the cartridge has a central well which is able to receive said driving shaft;

the cartridge has a lower opening adapted to be closed by said closure member and an upper opening adapted to be closed by an additional, openable closure member, said lower and upper openings being aligned and central able to receive said transmission device;

the driving mechanism is motorized;

the housing of the grinding mill includes an internal container adapted to receive material to be ground from the cartridge when the cartridge is coupled to the grinding mill, said internal container communicating with the grinding mechanism;

the grinding mill includes an electric motor for driving the grinding mechanism and means for disabling operation of said electric motor unless a cartridge is coupled to the grinding mill;

the closure member is a foil and the opening member is adapted to interfere tangentially with said foil to open it when the cartridge is coupled to the grinding mill;

the cartridge is adapted to be coupled to the grinding mill following a certain coupling movement and the opening member is adapted to interfere tangentially with the foil when the cartridge follows said coupling movement;

the cartridge includes a blister and said foil is adhered to the blister;

the opening member is adapted to either separate the foil from the blister, or tear the foil when the cartridge is coupled to the grinding mill;

the cartridge contains an alimentary material to be ground.

Another object of the present invention is a grinding system, comprising:

reusable means for grinding a material to be ground;

disposable means for containing the material to be ground; and means for coupling the disposable containing means to the reusable grinding means such that the material to be ground accesses the grinding means.

Besides, still another object of the present invention is a grinding mill comprising:

a housing which is adapted to receive a removable reload cartridge defining an internal volume which is adapted to contain a material to be ground, a grinding mechanism which is mounted in said housing and which is adapted to grind particles of said material, wherein the grinding mill includes an opening member which is adapted to open a closure member of said cartridge toward said grinding mechanism when said cartridge is coupled to grinding mill.

various embodiments of the grinding mill as defined above, one may possibly have recourse in addition to one and/or other of the following arrangements:

the opening member is adapted to interfere with said closure member to open said closure member when said cartridge is coupled to the grinding mill;

the opening member belongs to the grinding mechanism;

the opening member is a transmission shaft adapted to rotate a grinding wheel belonging to said grinding mechanism;

the opening member belongs to the housing;

the opening member protrudes from a portion of the grinding mill and said opening member is adapted to push on said closure member toward the internal volume of the cartridge and break at least part of the closure member of the cartridge when said cartridge is mounted on the grinding mill;

the housing of the grinding mill is adapted to receive the cartridge by snap fitting;

the grinding mill is adapted to receive the cartridge by screwing and the opening member is adapted to stop the closure member of the cartridge in rotation while the cartridge is being screwed on the grinding mill, so as to pivot the closure member toward an open position;

the grinding mechanism is connected to a driving mechanism by a driving shaft, said grinding mill and said driving mechanism being adapted to receive the cartridge between them;

the driving mechanism is motorized;

the housing of the grinding mill defines a recess adapted to receive the cartridge and said housing includes a removable cover which is adapted to close said recess;

the removable cover is adapted to push on the cartridge to open said closure member;

the removable cover is adapted to push the cartridge toward said opening member when coupling the cartridge to the grinding mill, said opening member protruding inside said recess and being in register with the closure member of the cartridge, so that said opening member exerts a pressure on said closure member and opens said closure member when the cartridge is coupled to the grinding mill;

the grinding mill is adapted to be used with a cartridge having a frangible closure member and a deformable wall opposite said closure member, said opening member being adapted to push on said deformable wall of the cartridge toward said closure member;

the housing of the grinding mill defines a recess adapted to receive the cartridge and said housing includes a removable cover which is adapted to close said recess, the opening member being movable with said cover;

the housing of the grinding mill includes an internal container adapted to receive material to be ground from the cartridge when the cartridge is coupled to the grinding mechanism, said internal container communicating with the grinding mechanism;

the grinding mill includes an electric motor for driving the grinding mechanism and means for disabling operation of said electric motor unless a cartridge is coupled to the grinding mill;

the opening member is adapted to interfere tangentially with a foil forming the closure member of the cartridge to open said foil when the cartridge is coupled to the grinding mill.

Another object of the present invention is a grinding mill, comprising:

means for grinding a material to be ground;
means for containing the material to be ground; and
means for coupling the containing means to the grinding means such that the material to be ground accesses the grinding means.

A further object of the present invention is a reload cartridge adapted to be removably coupled to a grinding mill including a housing and a grinding mechanism, said cartridge defining an internal volume which is adapted to contain particles of a material to be ground, said cartridge having at least one closure member which is adapted to close said internal volume before said cartridge is coupled to said grinding mill and to open toward said grinding mechanism when said cartridge is coupled to said grinding mill, wherein said closure member is adapted to be opened by an opening member of the grinding mill when said cartridge is coupled to the grinding mill.

In various embodiments of the reload cartridge as defined above, one may possibly have recourse in addition to one and/or other of the following arrangements:

the closure member is adapted to interfere with the opening member of the grinding mill to open said closure member when said cartridge is coupled to the grinding mill;

the closure member is adapted to seal tightly the cartridge;

the closure member is at least partially frangible and is adapted to be broken by said opening member when said cartridge is coupled to the grinding mill;

the closure member is attached to an external wall belonging to the cartridge at least before said cartridge is coupled for the first time to the grinding mill, said closure member having a periphery which is connected to said external wall by at least one frangible bridge;

said periphery of the closure member is further connected to said external wall by a hinge enabling the closure member to pivot relative to the external wall of the cartridge when said closure member is opened;

the closure member is an elongate tongue extending longitudinally from said hinge;

said periphery of the closure member is connected to said external wall solely by said frangible bridge;

the closure member comprises a frangible membrane;

the cartridge has a peripheral wall and a coupling member which is connected to said peripheral wall, said cartridge being adapted to be rotatably mounted on the housing of the grinding mill and said coupling member being able to drive the grinding mechanism of the grinding mill when said cartridge is rotated;

the coupling member is in the internal volume of the cartridge and is rigid with the peripheral wall of the cartridge, the closure member being adapted to let a transmission shaft of the grinding mechanism enter into said internal volume and fit with said coupling member when said closure member is open;

the coupling member is rigid with the closure member, the cartridge has a secondary coupling member which is in the internal volume of the cartridge and which is rigid with the peripheral wall of the cartridge, the coupling member being adapted to be pushed into said internal volume by a transmission shaft of the grinding mechanism and to fit with said secondary coupling member when the cartridge is mounted on the grinding mill;

the cartridge is adapted to be snap fitted on the grinding mill;

the cartridge is adapted to be screwed on the grinding mill by rotation around an axis of rotation, the cartridge has an end wall having at least one perforation and the closure member is pivotally mounted on said end wall around said axis of rotation, between a closed position wherein said closure member closes said perforation and an open position wherein said closure member opens said perforation, and the closure member is adapted to be stopped by the opening member in rotation while the cartridge is being screwed on the grinding mill, so as to pivot toward the open position;

said closure member is such that opening of said closure member is irreversible;

the closure member of the cartridge is frangible and the cartridge further includes a deformable wall opposite said closure member, the closure member being adapted to break under pressure when the opening member pushes on said deformable wall;

the cartridge includes a blister and the closure member is a foil adhered to the blister;

the cartridge contains an alimentary material to be ground.

Another object of the present invention is a method for distributing a material to be ground, comprising:

providing a material to be ground in a disposable cartridge defining an internal volume adapted to contain the material to be ground and comprising a closure member;

wherein the closure member is opened as a direct result of coupling the disposable cartridge to a grinding unit comprising a grinding mechanism;

wherein opening the closure member allows the material to be ground to access the grinding mechanism.

In various embodiments of the above method for distributing a material to be ground, one may possibly have recourse in addition to one and/or other of the following features:

the grinding unit is reusable;

the disposable cartridge is removable from the grinding unit and can be replaced with another disposable cartridge;

the grinding unit comprises an opening member adapted to open the closure member when the disposable cartridge is coupled to the grinding unit;

the disposable cartridge is coupled to the grinding unit by snap-fitting the disposable cartridge onto the grinding unit; the disposable cartridge is coupled to the grinding unit by screwing the disposable cartridge onto the grinding unit;

the closure member is at least partially ruptured when opened;

the closure member is at least partially plastically deformed when opened;

the grinding unit further comprises a driving mechanism;

the disposable cartridge is interposed between the grinding mechanism and the driving mechanism;

the material to be ground is a particle, grain, flake, or granule of a solid material;

the material to be ground is selected from a spice, coffee, or sugar;

the spice is selected from pepper and salt.

Still another object of the present invention is a method for selling a material to be ground, comprising:

providing a reusable grinding unit comprising a grinding mechanism to a potential customer of the material to be ground;

selling the material to be ground to the potential customer in a disposable cartridge defining an internal volume adapted to contain the material to be ground and comprising a closure member;

wherein the closure member is opened as a direct result of coupling the disposable cartridge to the grinding unit;

wherein opening the closure member allows the material to be ground to access the grinding mechanism.

In various embodiments of the above method for selling a material to be ground, one may possibly have recourse in addition to one and/or other of the following features:

- the method further comprises selling a second disposable cartridge containing material to be ground to the potential customer, wherein the disposable cartridge is removable from the grinding unit and is replaced with the second disposable cartridge;
- the grinding unit comprises an opening member adapted to open the closure member when the disposable cartridge is coupled to the grinding unit;
- the disposable cartridge is coupled to the grinding unit by snap-fitting the disposable cartridge onto the grinding unit;
- the disposable cartridge is coupled to the grinding unit by screwing the disposable cartridge onto the grinding unit;
- the closure member is at least partially ruptured when opened;
- the closure member is at least partially plastically deformed when opened;
- the grinding unit further comprises a driving mechanism;
- the disposable cartridge is interposed between the grinding mechanism and the driving mechanism;
- the material to be ground is a particle, grain, flake, or granule of a solid material;
- the material to be ground is selected from a spice, coffee, or sugar;
- the spice is selected from pepper and salt.

Still another object of the present invention is a method for grinding a material, comprising:

providing a reusable grinding unit comprising a grinding mechanism; and coupling a disposable cartridge containing the material to be ground to the reusable grinding unit;

wherein the disposable cartridge comprises a closure member for containing the material to be ground; and wherein the closure member is opened as a direct result of coupling the disposable cartridge to the grinding unit thereby allowing the material to be ground to access the grinding mechanism.

BRIEF DESCRIPTION OF THE DRAWINGS

Other features and advantages of the invention appear from the following detailed description of eleven embodiments thereof, given by way of non-limiting examples, and with reference to the accompanying drawings.

In the drawings:

FIGS. 22 and 23 are exploded perspective views of a grinding system according to a seventh embodiment of the invention, FIG. 25 is a vertical cross section of the grinding system of FIGS. 22 and 23, during insertion of a new cartridge inside the housing of a grinding mill of this grinding system, FIG. 30 is a vertical cross section of the grinding system of FIG. 29, during insertion of the cartridge of this grinding system inside the housing of the grinding mill, FIG. 31 is a cross section similar to FIG. 30 after coupling of the cartridge to the grinding mill, FIG. 32 is an exploded perspective view of a grinding system according to a ninth embodiment of the invention, FIG. 33 is perspective view of a cartridge belonging to the grinding system of FIG. 32, FIG. 39 is a vertical cross section of a cartridge belonging to the grinding system of FIG. 38, FIG. 40 is a vertical cross section of the grinding system of FIG. 38 when the cartridge is coupled with the grinding mill for reloading the internal container of the grinding mill, FIG. 42 is a perspective view of a grinding system according to an eleventh embodiment of the invention, FIG. 43 is a rear perspective view of a cartridge belonging to the grinding system of FIG. 42, FIG. 44 is a vertical section view of the grinding system of FIG. 42, during insertion of the cartridge in the grinding mill, FIG. 45 is a section view along line XXXXV-XXXXV of FIG. 44.

MORE DETAILED DESCRIPTION

In the Figures, the same references denote identical or similar elements.

All the embodiments of the invention relate to a grinding system 1 adapted to grind particles of a solid material, for instance particles of an alimentary material, such as pepper grains, salt grains or grains of other spices, or sugar, coffee, etc.

Figure 1:
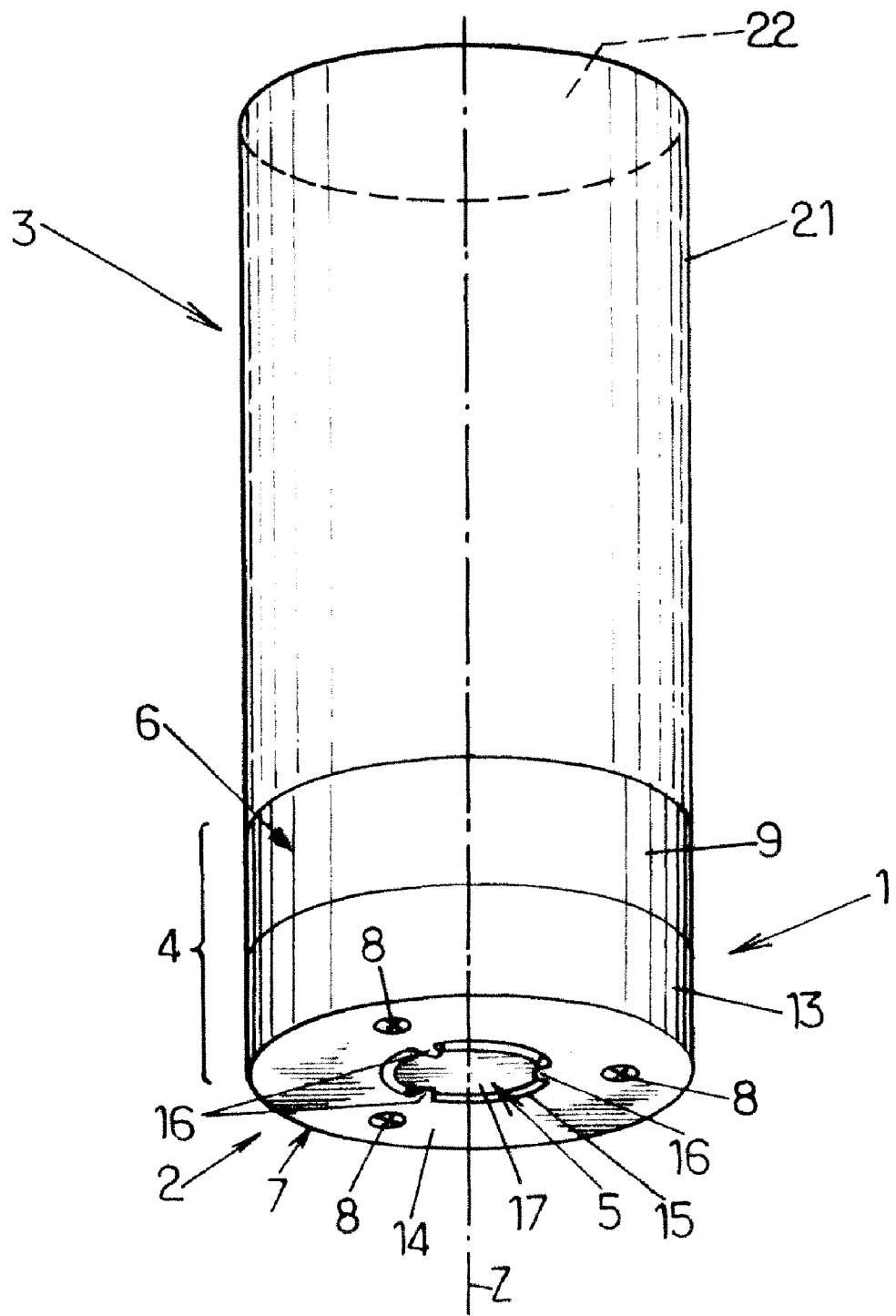
FIG. 1 is a perspective view of a grinding system according to a first embodiment of the invention.

In the particular example shown on FIG. 1, the grinding system 1 has a substantially cylindrical general shape, having a central axis of revolution Z.

Figure 2:
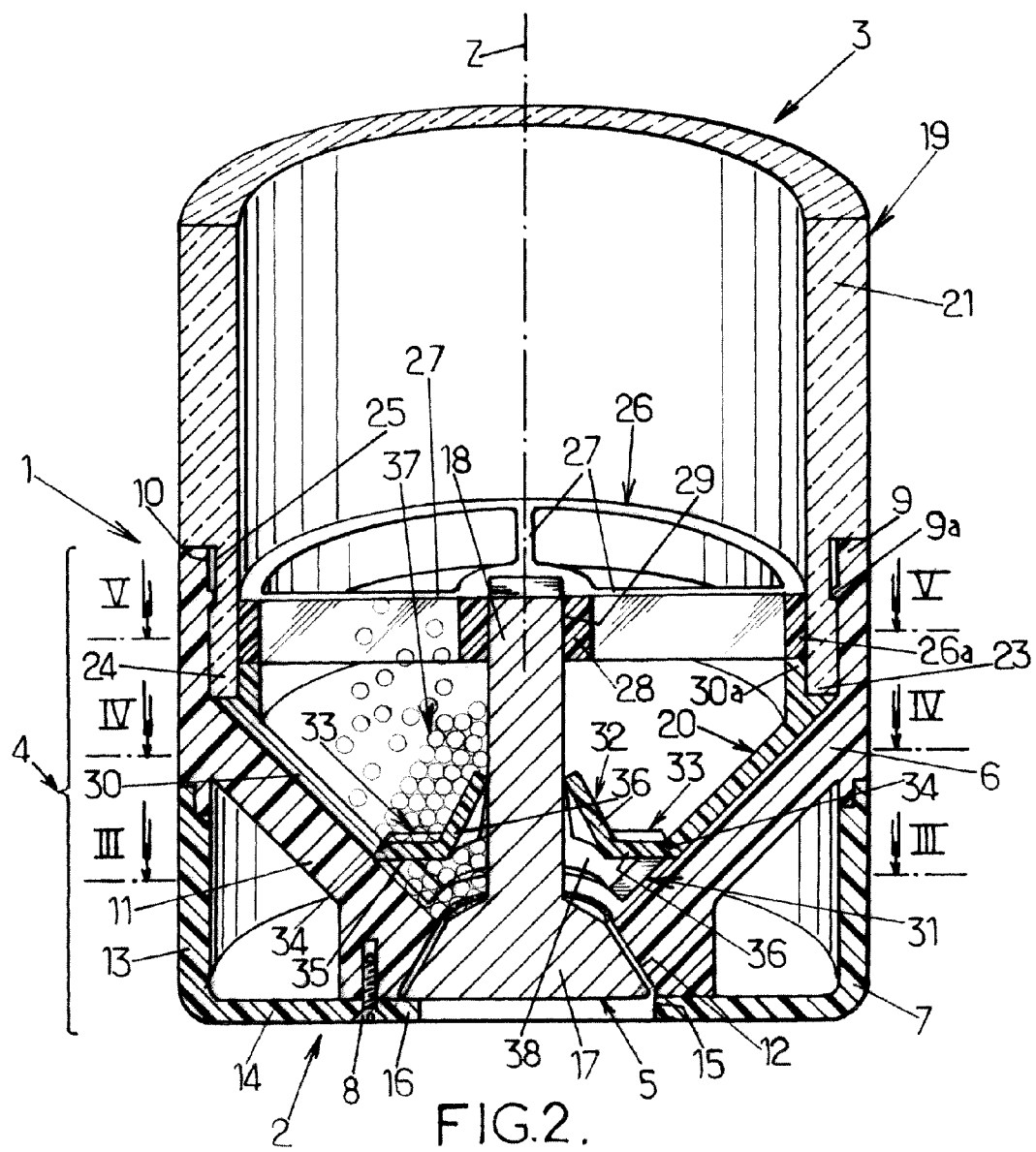
FIG. 2 is a perspective section view of part of the grinding system of FIG. 1, FIGS. 3 to 5 are cross sections, respectively along lines IV-IV and V-V of FIG. 2.

As shown on FIGS. 1 and 2, the grinding system according to the first embodiment of the invention, includes a grinding mill 2 and a removable reload cartridge 3 containing the material to be ground. The cartridge 3 is adapted to be coupled to the grinding mill 2 to feed said grinding mill with material to be ground. In the present case, such coupling of the cartridge to the grinding mill means that the cartridge is mounted on the grinding mill and remains mounted during use of the grinding mill.

The grinding mill 2 includes a housing 4 and a grinding mechanism 5 mounted on the housing 4.

In the particular example shown on FIGS. 1 and 2, the housing 4 may comprise two pieces which may be for instance molded out of hard plastic material or other, to with:
 a main body 6,
 a bottom 7 which is fixed under the main body 6, for instance by screws 8 or by any other means.

The main body 6 of housing 4 may for instance include an annular lateral wall 9 of cylindrical shape, centered on axis Z, which forms part of the lateral surface of the grinding system 1 and which defines an opening 10 oriented upward in the normal position of use of the grinding system. The lateral wall 9 is extended, at its lower end, by a frustoconical hopper 11 which opens downward in a diverging conduit 12 having inner teeth forming a conical toothing. The main body may be molded out of plastic material (for instance out of polyoxymethylene, e.g. Delrin®).

The bottom 7 of housing 4 may have an annular lateral wall 13 of cylindrical shape, centered on axis Z, which is fitted to the lower end of lateral wall 9 of the main body 6. This lateral wall 13 is extended, at its lower end, by an annular end wall 14 defining a central opening 15 in register with the diverging conduit 12. Further, in the example considered here, the end wall 14 may include tabs 16 which protrude radially inwardly in opening 15. The bottom 7 may be molded for instance out of plastic material.

The grinding mechanism 5 may include a grinding wheel 17 which is mounted inside diverging conduit 12 and which includes outer teeth forming a conical toothing and facing the inner teeth of conduit 12. The grinding wheel 17 is retained in conduit 12 by the tabs 16 of bottom 7 and is mounted with clearance in conduit 12 so as to be able to rotate in conduit 12 around axis Z. As in any classical grinding mill, the clearance is sufficient to ensure that the grains of pepper or other material to be ground can penetrate between the inner and outer teeth in order to be ground by said teeth. Said clearance may for instance increase from the bottom of the grinding wheel 17 to the top of said grinding wheel, en help the material to be ground penetrate between the grinding wheel and the diverging conduit 12.

The grinding mechanism 5 further includes a transmission shaft 18 which is unitary with the grinding wheel 17 and which protrudes upwardly from said grinding wheel, inside hopper 11 and lateral wall 9. At least the upper end of transmission shaft 18 has a noncircular cross-section, for instance a square cross-section. The transmission shaft 18 may have a constant cross-section on all its length, or alternately, may have a circular cross-section on most of its length and a non-circular cross section only at its upper end.

The grinding wheel 17 and the transmission shaft 18 may be for instance formed as a single piece, e.g. out of plastic material (for instance out of polyoxymethylene, e.g. Delrin®) or out of metal.

Besides, the cartridge 3 may include for instance a bottle 19 closed by a plug 20. Bottle 19 may be for instance molded out of transparent plastic material or other, whereas plug 20 may be for instance molded out of a similar or different plastic material.

Figure 5:
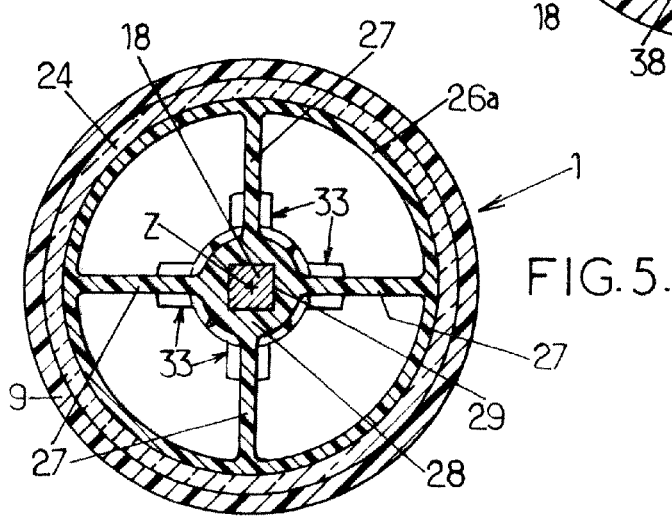

As shown on FIGS. 2 and 5, bottle 19 includes an annular lateral wall 21, which in this example has a cylindrical revolution shape, centered on axis Z. In the normal position of use of the grinding system, this lateral wall 19 extends between a closed upper end wall 22 and an open, lower annular end 23. At said lower end 23, the lateral wall 19 forms a neck 24 of reduced external diameter which, in the example considered here, is adapted to be snap fitted inside lateral wall 9 of housing 4. To this end, lateral wall 9 may for instance include an inner annular rib 9a which is adapted to penetrate inside an annular outer groove 25 of neck 24. One may use any other means adapted to attach the cartridge 3 to the grinding mill 3, by snap fitting, screwing or other.

In the particular example of FIG. 2, the cartridge 3 may further include a coupling device 26, which may be for instance made out of hard plastic material or other, and which may be tightly fitted inside lateral wall 21, in correspondence with the neck 24. This coupling device 26 includes a cylindrical ring 26a which is fitted inside the lateral wall 19 and which is rigid with said lateral wall. Ring 26a may be rigidly connected to lateral wall 21 for instance by welding (e.g. ultrasonic welding), or gluing or other.

The coupling device may include a central hub 28 and radial arms 27 connecting ring 26 to central hub 28. The hub 28 has a trough hole 29 extending along axis Z and having a cross-section corresponding to the upper end of transmission shaft 18, so that transmission shaft 18 may be tightly fitted in hole 29.

Finally, the neck 24 of bottle 19 is closed by the plug 20, which may include for instance a substantially frustoconical wall 30, converging downward in the normal position of use of the grinding system. In the example shown on FIG. 2, the frustoconical wall 30 is extended, at its upper end, by a cylindrical wall 30a having a cross-section similar to ring 26a, this cylindrical wall 30a being tightly fitted inside neck 24 and being secured to said neck 24 for instance by welding (e.g. ultrasonic welding), by gluing or other.

The frustoconical wall 30 is shaped to be received into the recess 31 defined by lateral wall 9 and hopper 11, with little or large clearance.

The lower end of the frustoconical wall 30 is terminated by a shutter 32 which is adapted to close the cartridge 3 before it is mounted for the first time on the grinding mill 2.

Figure 3:
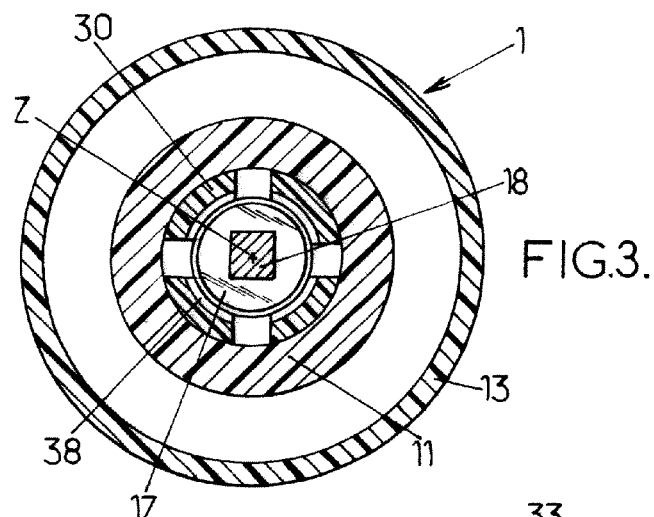
Figure 4:
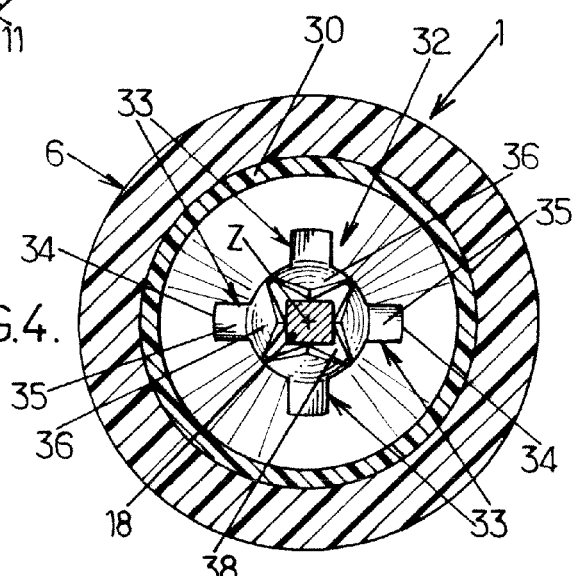

In the example shown on the drawings (see in particular FIGS. 2 to 4), the shutter 32 includes a plurality of closure members 33, for instance in the form of elongate flexible tongs. The shutter 32 may include for instance four closure members, but the number of closure members could be different, and the shutter 32 might include only one closure member.

The closure members are frangible, which means that the opening of the shutter may be obtained by rupturing the closure members or at least a portion of these closure members, for instance a bridge portion connected to the rest of the plug (or more generally connected to an external wall of the cartridge).

In the example considered here, each closure member 33 is connected to the frustoconical wall 30 by a portion of said wall of reduced thickness, forming a hinge 34, and includes for instance:

a first portion 35 having a substantially rectangular shape, which extends radially inwardly from the hinge 34 in the open position of the closure member as shown on FIG. 2, and a second portion 36 having a substantially triangular shape, extending radially inwardly and upwardly from said first portion 35 in the normal position of use as shown on FIG. 2.

Figure 6:
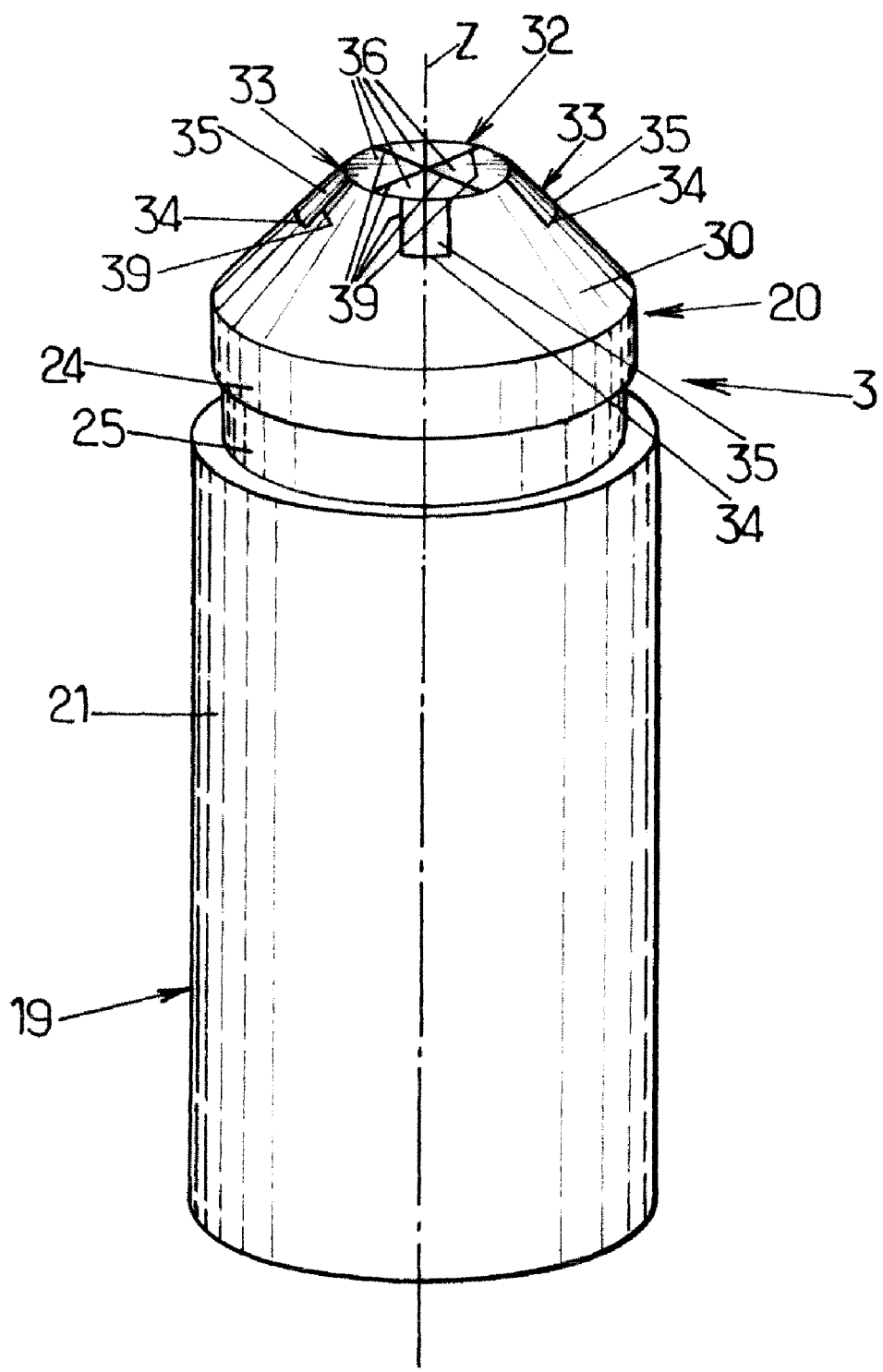
FIG. 6 is a perspective view showing a reload cartridge for the grinding system of FIGS. 1-5.
Figure 7:
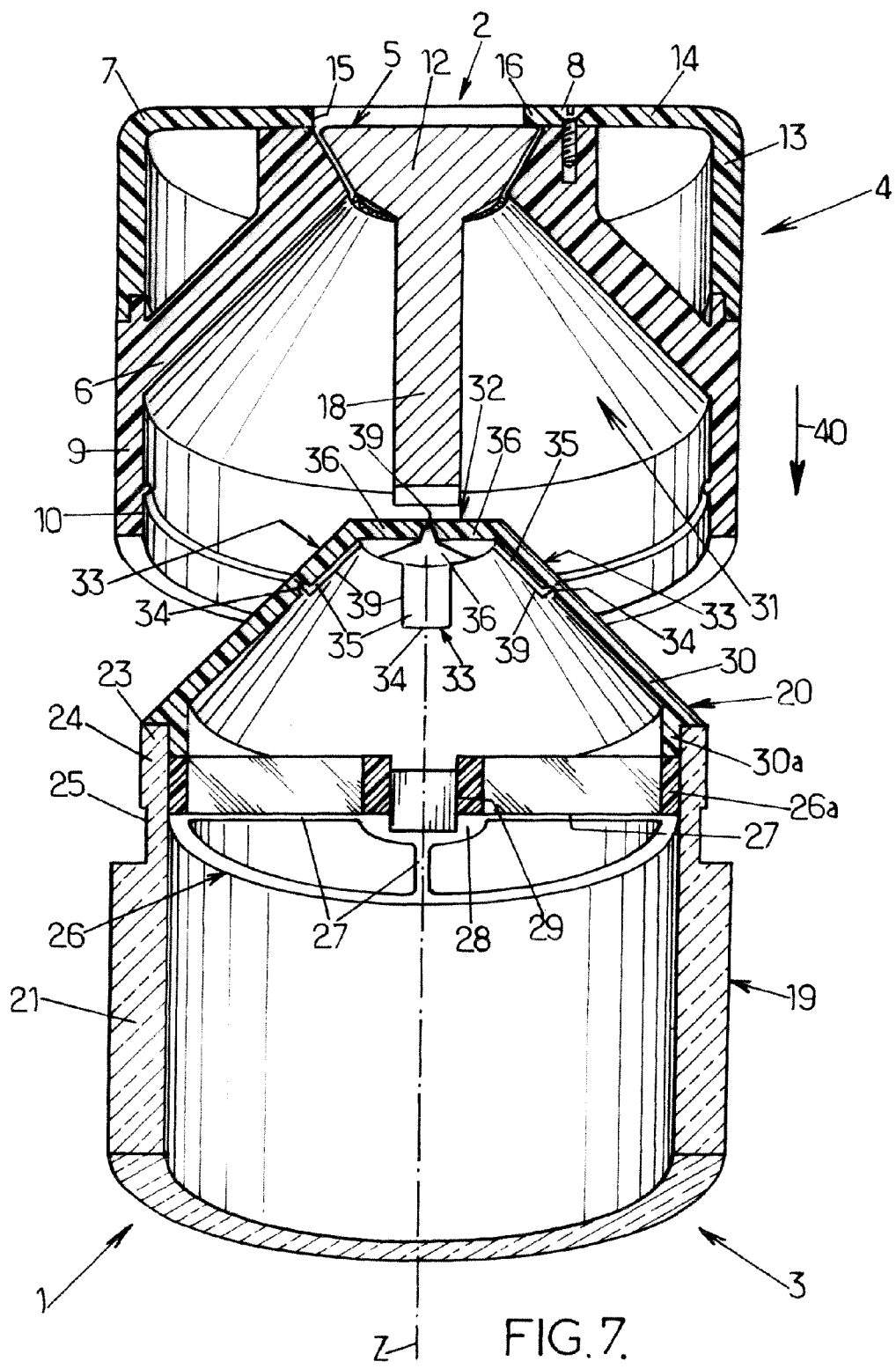
FIG. 7 is a view similar to FIG. 2, showing the reload cartridge being mounted on the grinding mill.

As shown on FIGS. 6 and 7, before the first mounting of cartridge 3 on grinding mill 2, the shutter 32 is closed and the closure members 33 are connected together and to the frustoconical wall 30 by continuous frangible bridges 39 which may be formed, for instance, by lines of reduced thickness of the plug 20 and which follow the periphery of each closure member 33 from both sides of the corresponding hinge 34. In the example shown on FIGS. 6 and 7, the second portions 36 of the closure members 33 form together a flat end of the plug 30 before opening of the shutter 32. In this position, the closure members 33, which may be molded in one piece with the rest of the plug 20, form a continuous surface which tightly seals the cartridge 3.

The material to be ground contained in the internal volume of the cartridge may therefore be kept under controlled conditions, for instance under predetermined hygrometry and/or under predetermined pressure (for instance under vacuum) and/or under an atmosphere of predetermined composition (for instance a gas atmosphere different from air, e.g. a nitrogen atmosphere).

It should be noted that alternatively, the shutter 32 might not seal tightly the internal volume of the cartridge 3. For instance, the frangible bridges 39 could be designed as discontinuous bridges, so as to maintain a communication between the ambient atmosphere and the internal volume of the cartridge even when the shutter 32 is closed.

When the reload cartridge 3 is being mounting on the grinding mill 2, the user has to fit cartridge 3 in the housing 4 of the grinding mill, in the direction of arrow 40 (FIG. 7). During this mounting, the grinding system may be for instance disposed upside down as shown, with the grinding mill 2 on top of the cartridge 3, but a mounting in the normal position of use would also be possible.

During this mounting, the transmission shaft 18 pushes on the second portion 36 of the closure members 33 and ruptures (breaks) the frangible bridges 39 of said closure members, so that said closure members 33 are plastically deformed by pivoting around their hinges 34 toward the inside of the cartridge 3, which opens shutter (the transmission shaft 18 therefore constitutes an opening member).

The second portions 36 of the closure members 33 bear then against transmission shaft 18, which therefore maintains the closure members 33 in an open position, wherein said closure members are pushed inside the cartridge 3. Thus, the material 37 to be ground may flow, through a substantially cross-shaped opening 38 which is formed between the closure members 33 (see FIG. 4), toward the lower portion of and hopper 11 and toward grinding mechanism 5.

This translation movement continues until the transmission shaft 18 penetrates in the hole 29 of the hub 28, after which the cartridge 3 is snap fitted in the housing 4. During this movement, a rotation of cartridge 3 relative to housing 4 may be necessary to enable transmission shaft 18 to fit into the hole 29 of the hub 28. Such fitting can be made easier if the hole 29 is flared toward the grinding mechanism 5.

After cartridge 3 has been mounted on grinding mill 2, the grinding system may be actuated by the user by turning the cartridge 3 relative the housing 4 around axis Z, which drives the grinding mechanism 5 though the transmission shaft 18. The material to be ground is therefore progressively ground by grinding mechanism 5, and the ground material goes out of the grinding mill downward trough the opening 15 of the bottom 17.

Of course, the actuation of the grinding system according to the invention can be not only manual as illustrated in the first embodiment of the invention, but also motorized, in which case the actuation could be done by an electric motor powered by the mains or by a battery (rechargeable or not).

When all the content of the cartridge 3 has been consumed, the user may remove the cartridge by exerting traction on said cartridge, in order to mount a new cartridge as explained above. The cartridge 3 is therefore disposable.

The use of reload cartridges greatly facilitates reloading of the system in material to be ground. The use of reload cartridges also ensures a controlled quality of the material to be ground, and in particular, that this material is proper for being used in the grinding mill, and that this material is kept under optimum conditions of conservation and of hygiene.

Figure 8:
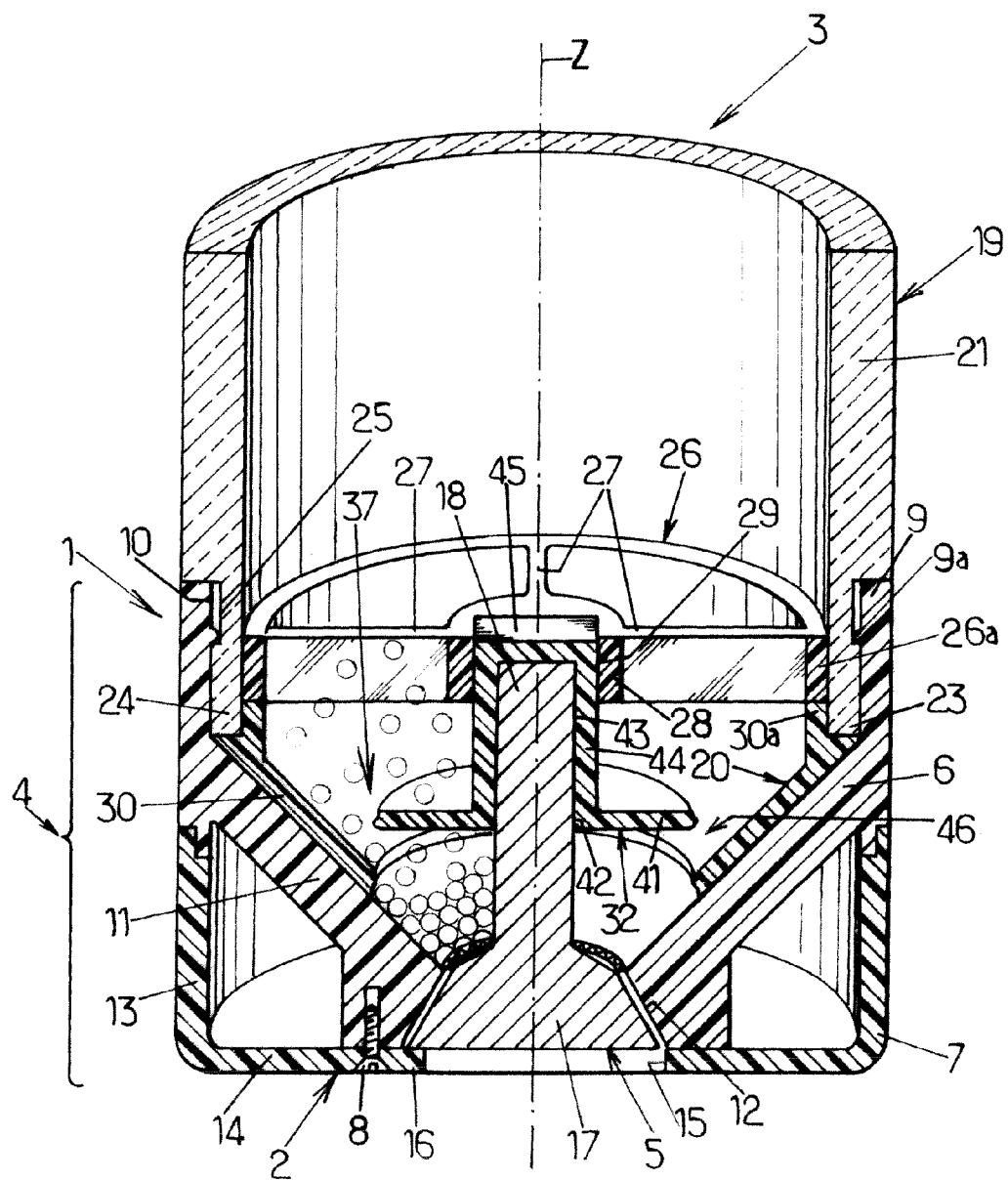
FIG. 8 is a section view similar to FIG. 2, in a second embodiment of the invention.
Figure 9:
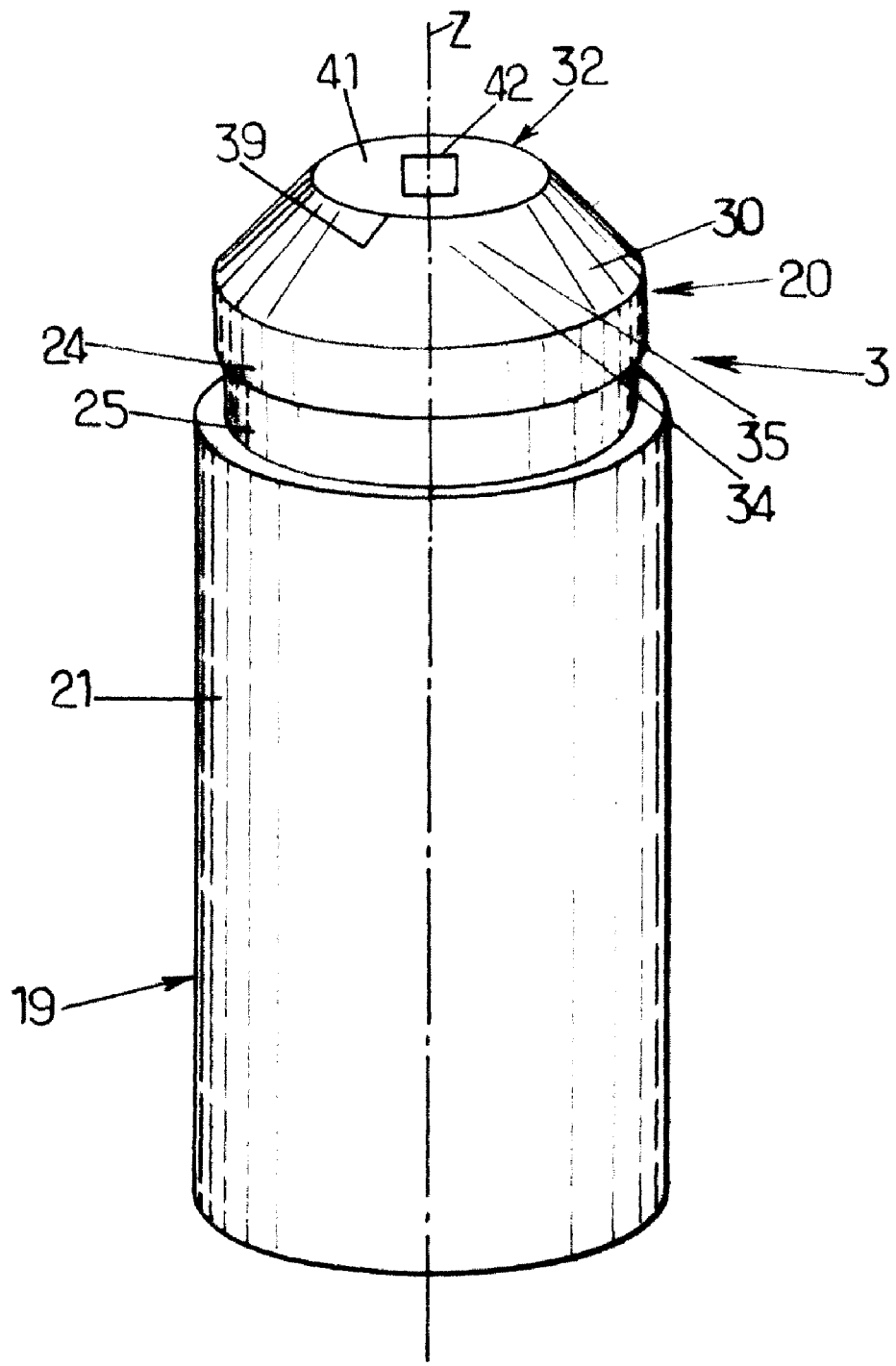
FIG. 9 is a perspective view showing the reload cartridge of the second embodiment of the invention, before being mounted on the grinding mill.
Figure 10:
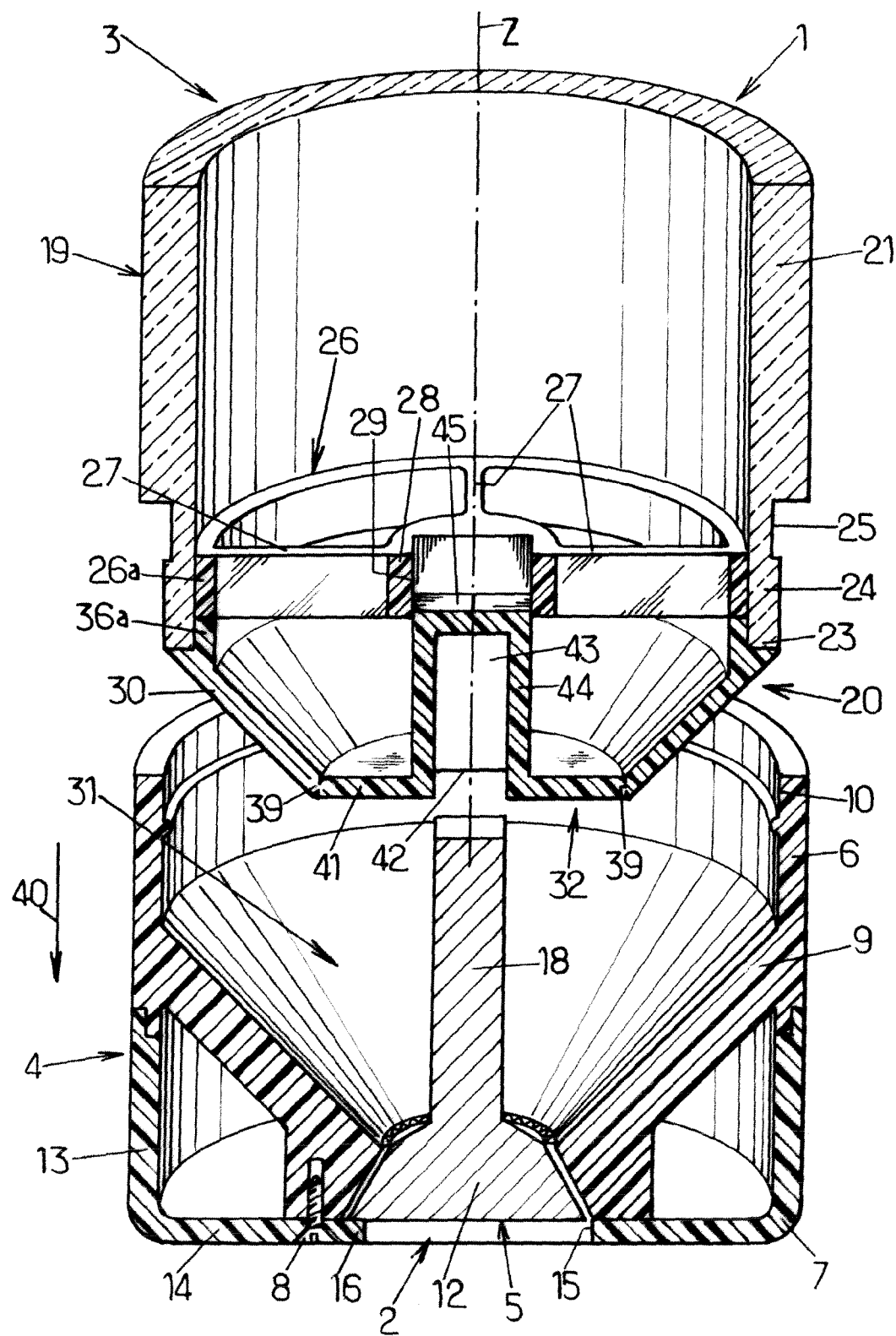
FIG. 10 is a perspective section view of the grinding system of FIG. 8, during mounting of the reload cartridge on the grinding mill.

In the second embodiment of the invention, shown on FIGS. 8-10, the external aspect of the grinding system 1 may be identical or similar to that of the first embodiment, shown on FIG. 1.

As shown on FIG. 8, this second embodiment of the invention is very similar to the first embodiment and will therefore not be described in details again, only the differences between the second and first embodiments being described hereafter.

This second embodiment mostly distinguishes from the first embodiment by a different realization of the shutter 32 of the cartridge, which here may include a single closure member 41, for instance in the shape of a disk 41 having a central opening 42.

The opening 42 communicates with a recess 43 formed inside a cup-shaped extension 44, which may be molded in one piece out of plastic material with closure member 41 and which extends along axis Z toward the internal volume of the cartridge 3. The recess 43 has a constant cross-section, corresponding to that of transmission shaft 18, so that said transmission shaft may be tightly or snugly fitted inside the cup-shaped extension 44, in abutment against the upper end wall 45 of said cup-shaped extension 44. Alternatively, the recess 43 may be slightly flared toward the grinding mechanism 5.

The outside cross-section of the cup-shaped extension 44 corresponds to the internal cross-section of the hole 29 of hub 28, and is tightly fitted inside said hole 29 so that the driving device 26 couples the bottle 19 to the cup-shaped extension 44 in rotation around axis Z, said cup-shaped extension being itself coupled in rotation with transmission shaft 18.

In the normal position of use, as shown on FIG. 8, the disk shaped closure member 41 is lifted inside the internal volume of cartridge 3, so that an annular opening is defined between the outer periphery of the disk shaped closure member 41 and the lower end of the frustoconical wall 30 of the plug 20.

The material 37 to be ground may therefore flow downward through said annular opening 46, toward the lower portion of hopper 11 and toward the grinding mechanism 5.

As shown on FIGS. 9 and 10, before the cartridge 3 is mounted on the grinding mill 2 for the first time, the disk-shaped closure member 41 is connected to the frustoconical wall 30 of the plug by a continuous annular bridge 39 which may be constituted for instance by an annular line of reduced thickness of the plug, the closure member and the rest of the plug being for instance molded in a single piece out of plastic material.

As in the first embodiment of the invention, the cartridge 3 may therefore be tightly sealed and the internal volume of the cartridge 3 may be kept under control conditions (controlled hygrometry and/or controlled pressure and/or controlled gas content).

As shown on FIG. 10, when mounting the cartridge 3 on the grinding mill 2 for the first time, the lower end 23 of the cartridge is inserted in the recess 31 of the housing 4 in the direction of arrow 40, and the transmission shaft 18 is inserted in the recess 43 of the cup-shaped extension 44 of the closure member 41, until the upper end of the transmission shaft 18 comes into abutment with the upper end wall 45 of said cup-shaped extension 44.

The user must then continue to push on the cartridge 3 in the direction of arrow 40, so that the frangible bridge 39 ruptures, enabling the cartridge 3 to be pushed downward until it is snap-fitted in the housing 4. During this movement, the closure member 41 is lifted relative to the frustoconical wall 30 of the plug, which opens the annular opening 46 as mentioned above with regard to FIG. 8. The mounting of the cartridge 3 may be carried out in the normal position of use of the grinding mill 2.

Figure 11:
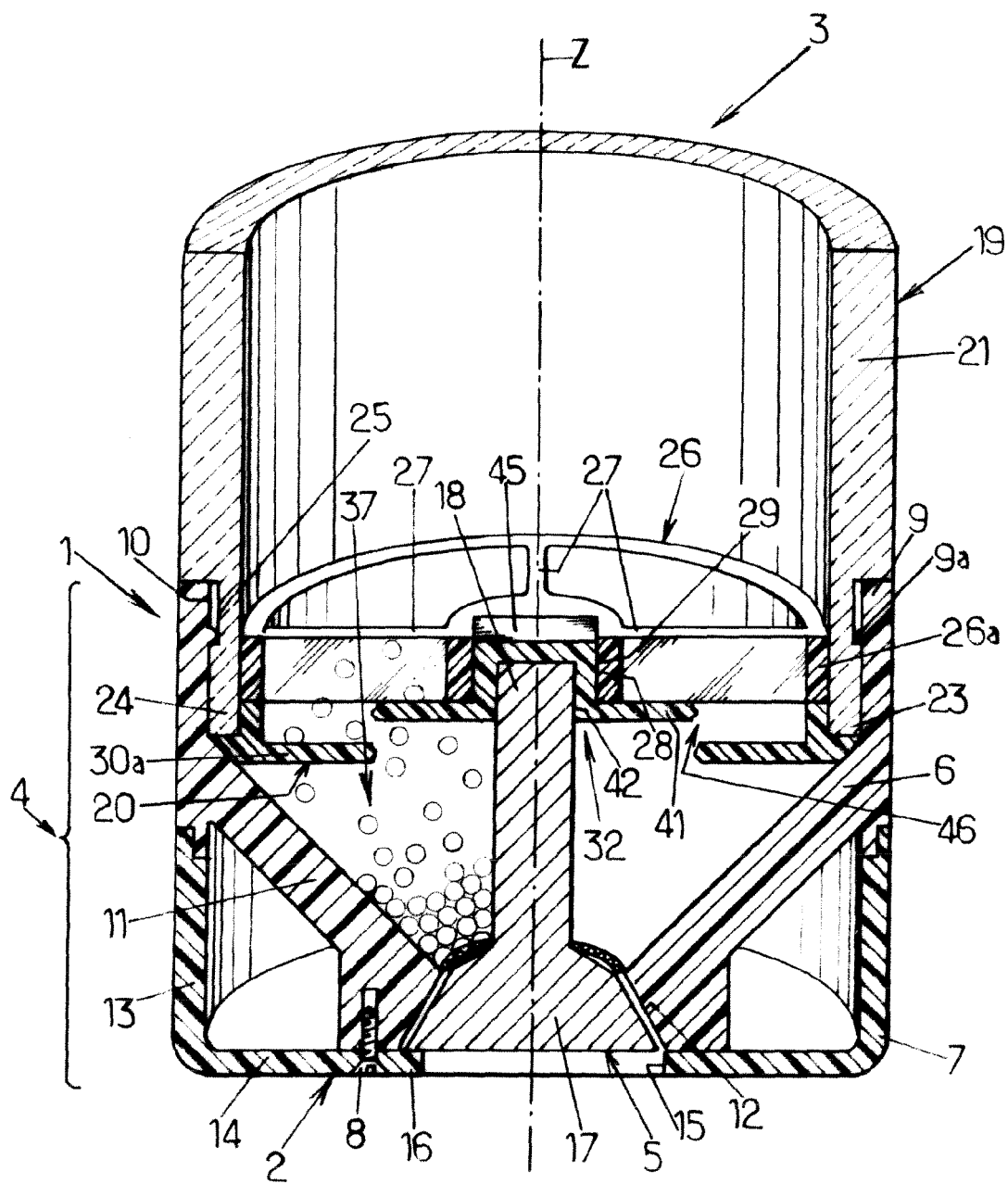
FIGS. 11-13 show similar views to FIGS. 8-10, in a third embodiment of the invention.
Figure 12:
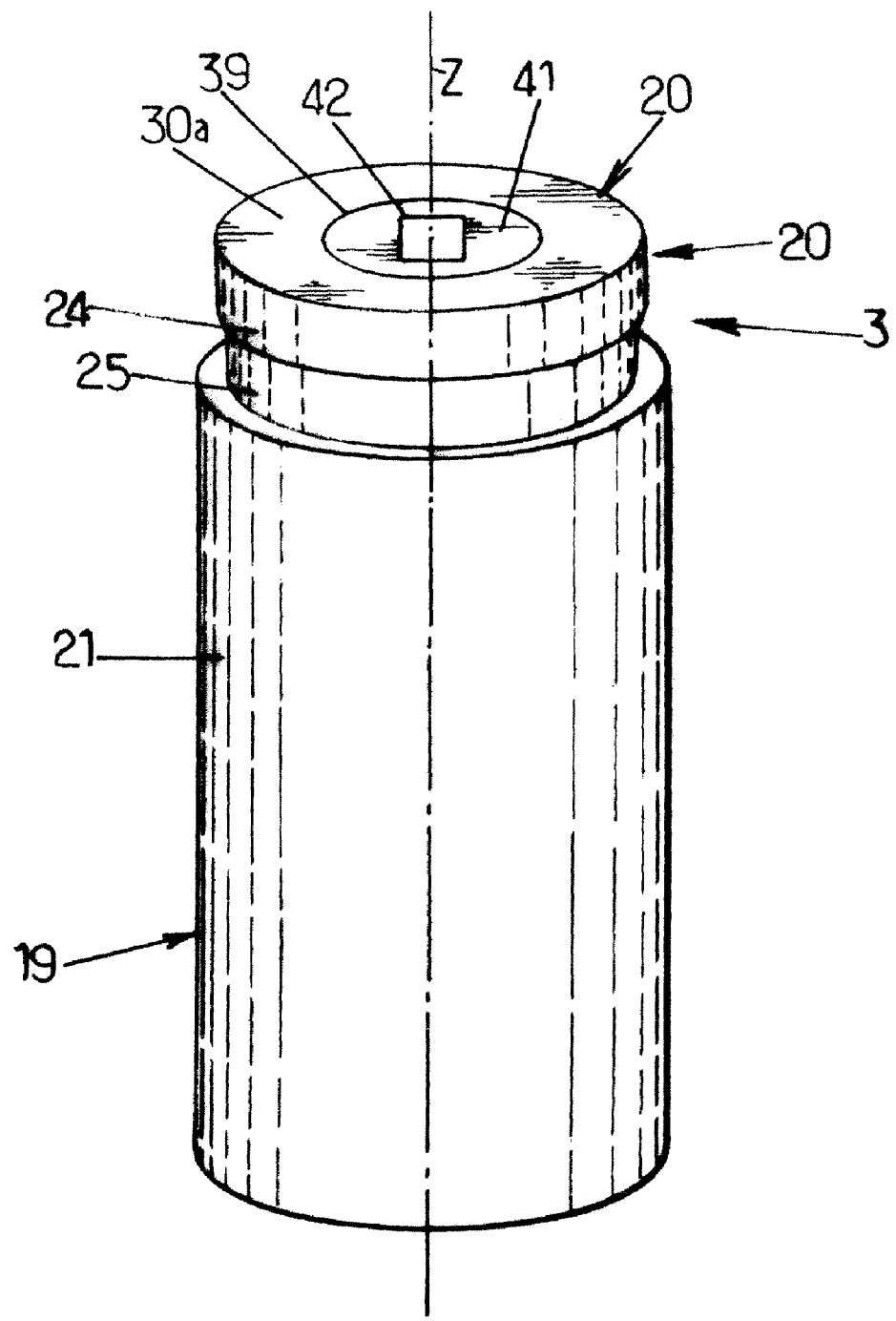
Figure 13:
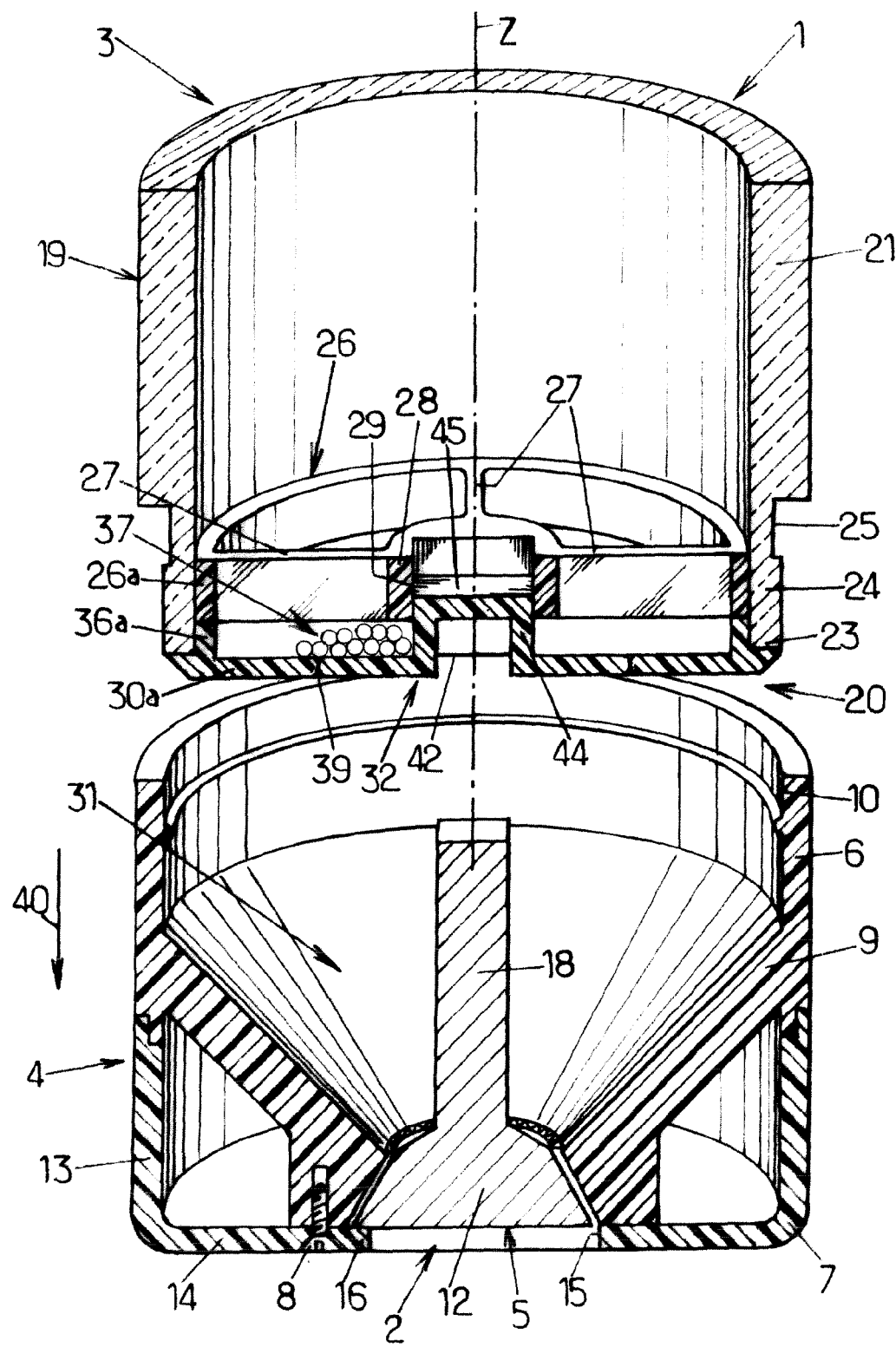

The third embodiment of the invention, showed on FIGS. 11-13, is similar to the second embodiment described above and will therefore not be described again in details.

This third embodiment distinguishes from the second embodiment by the following differences:

the frustoconical wall of the cartridge 3 is replaced by a flat end wall 30a which, before the disk shaped closure member 41 is open, lies in the same plane as said closure member 41, and the cup-shaped extension 44 is made shorter parallel to axis Z.

The operation of the third embodiment is similar to the operation of the second embodiment described above.

Figure 14:
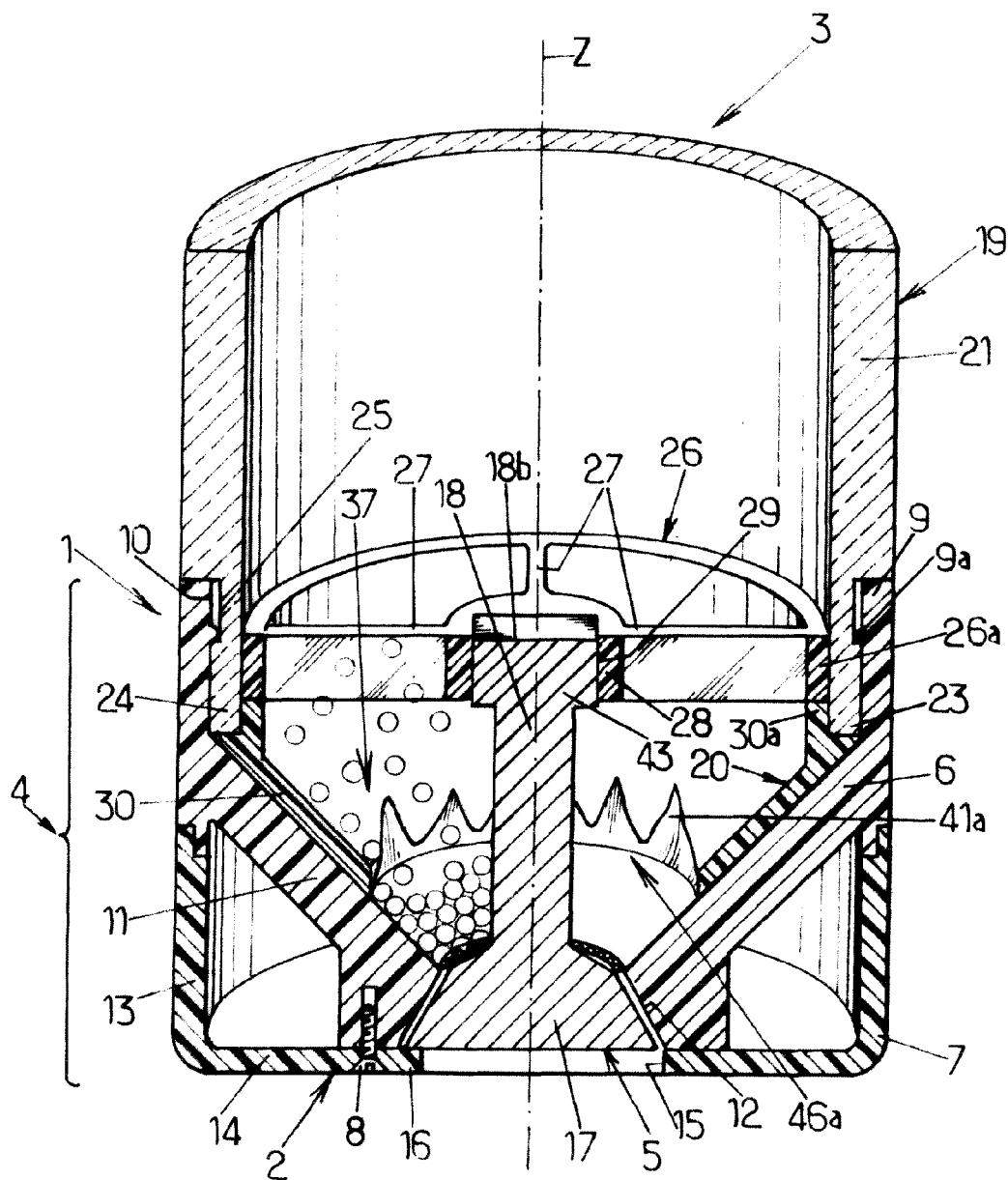
FIGS. 14-16 are similar views to FIGS. 8-10, in a fourth embodiment of the invention.
Figure 15:
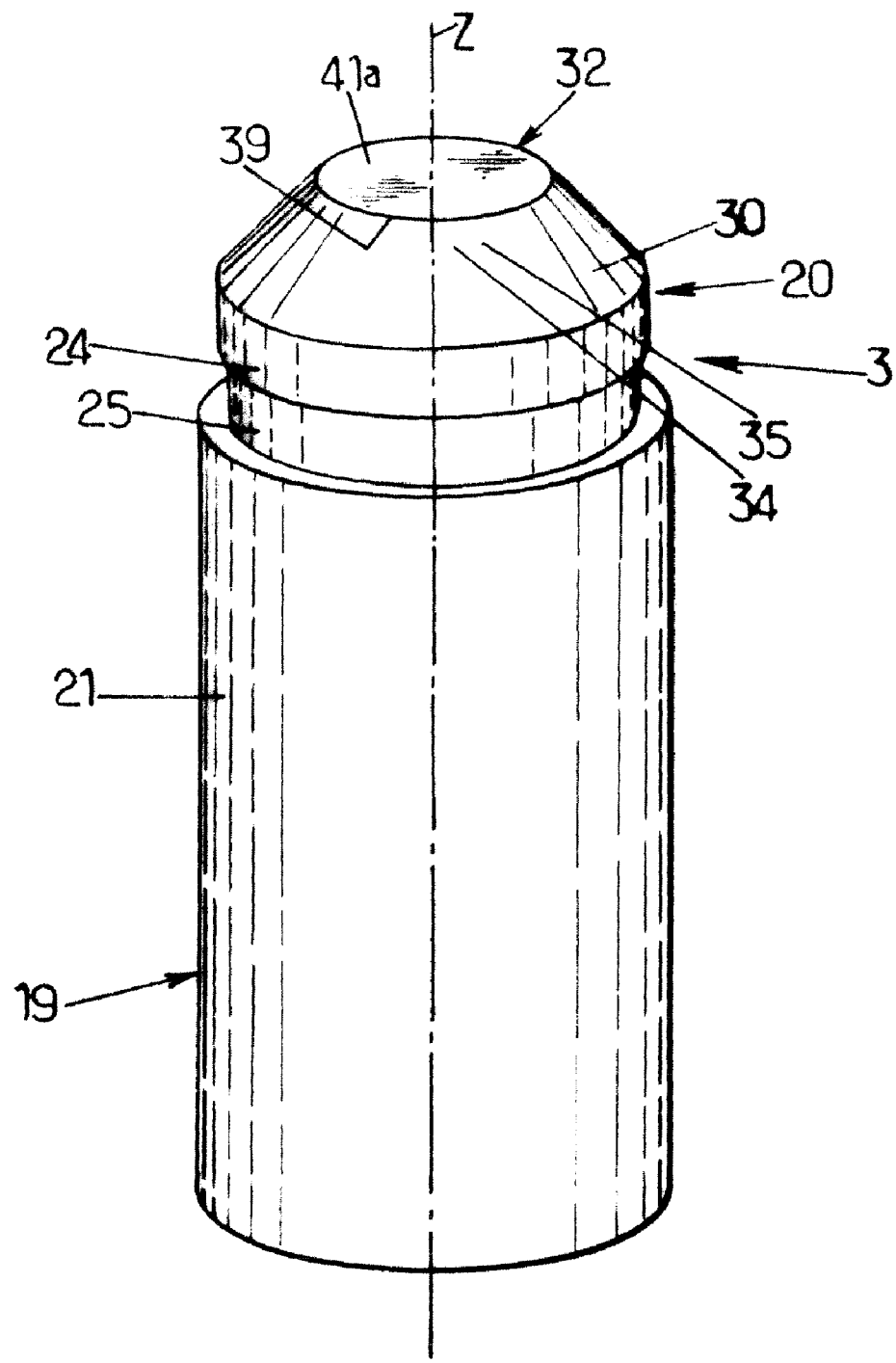
Figure 16:
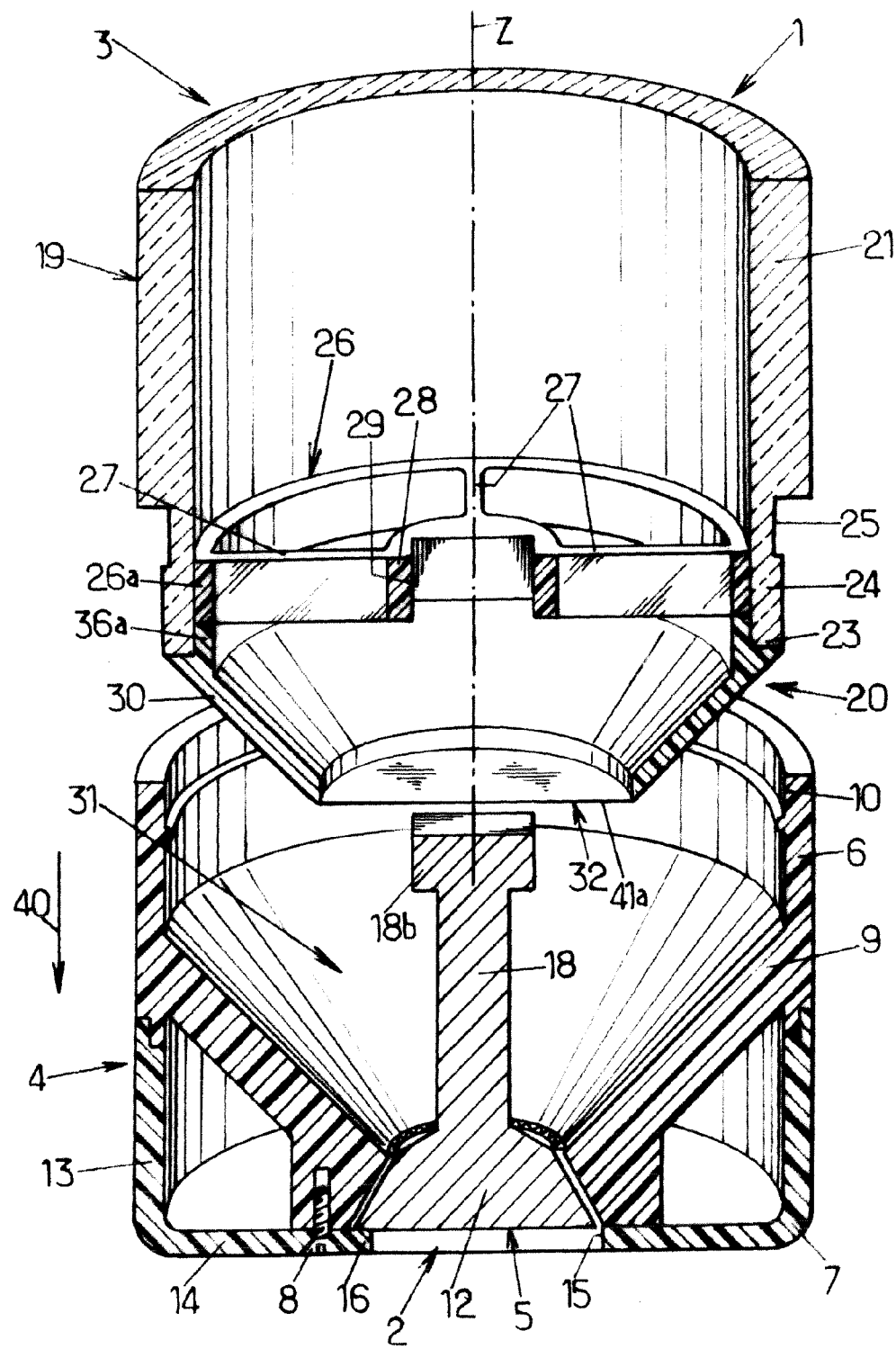

In the fourth embodiment of the invention, shown on FIGS. 14-16, the grinding mill 2 is similar to that of the second and third embodiments, except that transmission shaft 18 may possibly include an enlarged upper head 18b having the same cross section as the central hole 29 of hub 28.

Besides, the reload cartridge 3 of this fourth embodiment may be similar to the reload cartridge of the second and third embodiments, except that the disk-shaped closure member 41 is replaced by a frangible membrane 41a, for instance a metallic membrane or a plastic membrane or a multilayer membrane, the periphery of which is fixed to the edge of the lower opening 30b of the frustoconical wall 30.

The membrane 41a constitutes a closure member which, before the cartridge 3 is mounted on the grinding mill 2, may be flat and extend radially relative to axis Z.

When the cartridge 3 is mounted on the grinding mill 2, the transmission shaft 18 of the grinding mechanism, and more particularly the enlarged head 18b of said transmission shaft, ruptures the frangible membrane 41a to as to form a central opening 46a at the lower end of frustoconical wall 30 (see FIG. 14). When the cartridge 3 is pushed further toward the grinding mill 2, the enlarged head 18b (or more generally the upper end of the transmission shaft 18) is fitted in the central hole 29 of the hub 28, thereby coupling the cartridge 3 with the transmission shaft 18 and the grinding wheel 17. Due to the central opening 46a, the material 37 to be ground can flow downward from the inside of the cartridge 3 toward the grinding mechanism 5, and can be ground when the cartridge 3 is turned around axis Z relative to the housing 4 of the grinding mill.

In this fourth embodiment of the invention, it should be noted that the plug 20 could possibly be omitted, in which case the frangible membrane 41a would be fixed by welding, gluing or other, directly a the lower end 23 of the lateral wall 21 of bottle 19.

In this fourth embodiment of the invention, the internal volume of the cartridge 3 may be sealed tightly by the frangible membrane 41a before mounting the cartridge on the grinding mill, to keep the material 37 to be ground under controlled conditions. Alternatively, the internal volume of the cartridge 3 may be in communication with the ambient atmosphere before mounting the cartridge on the grinding mill.

In the fifth embodiment of the invention, shown on FIGS. 17 and 18, the grinding system 1 includes a grinding mill 2 which is similar to the grinding mill of the first and second embodiments, and which will therefore not be described in details: only the differences between the grinding mill 2 of the fifth embodiment and the grinding mill 2 of the first and second embodiments will be described hereafter.

The grinding mill 2 of the fifth embodiment mostly distinguishes from the grinding mill 2 of the first and second embodiments by the following differences:

the lateral wall of the main body 6 of the grinding mill has an internal thread 9a (see FIG. 18), said lateral wall 9 includes an upper neck 47 of reduced diameter, which includes an outer annular groove 48 and an inner thread 9b, and the hopper 11 includes an opening member 49 which may for instance be in the form of a radially and upwardly extending rib molded as a single piece with the main body 6.

Figure 17:
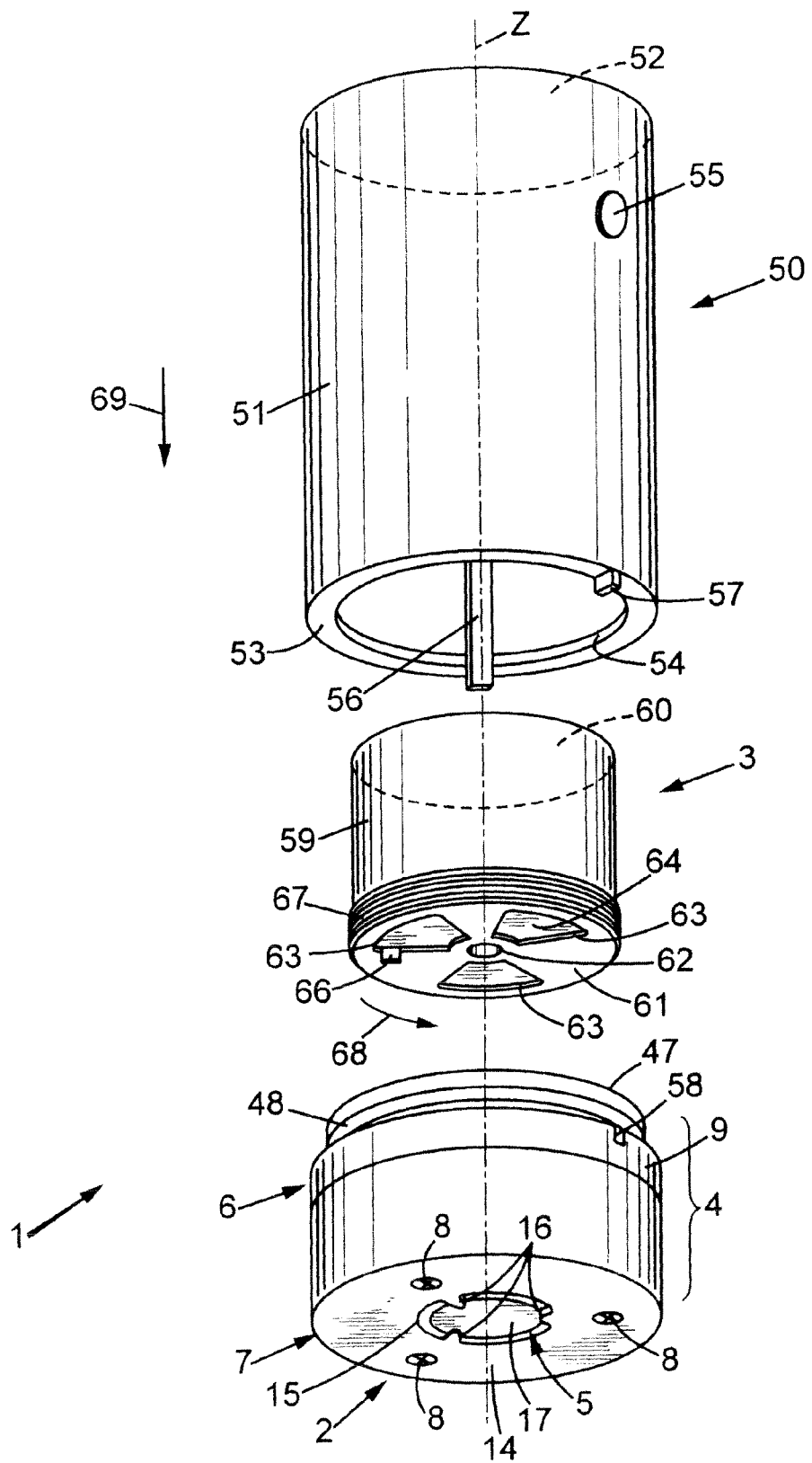
FIG. 17 is an exploded view showing a grinding system according to a fifth embodiment of the invention.
Figure 18:
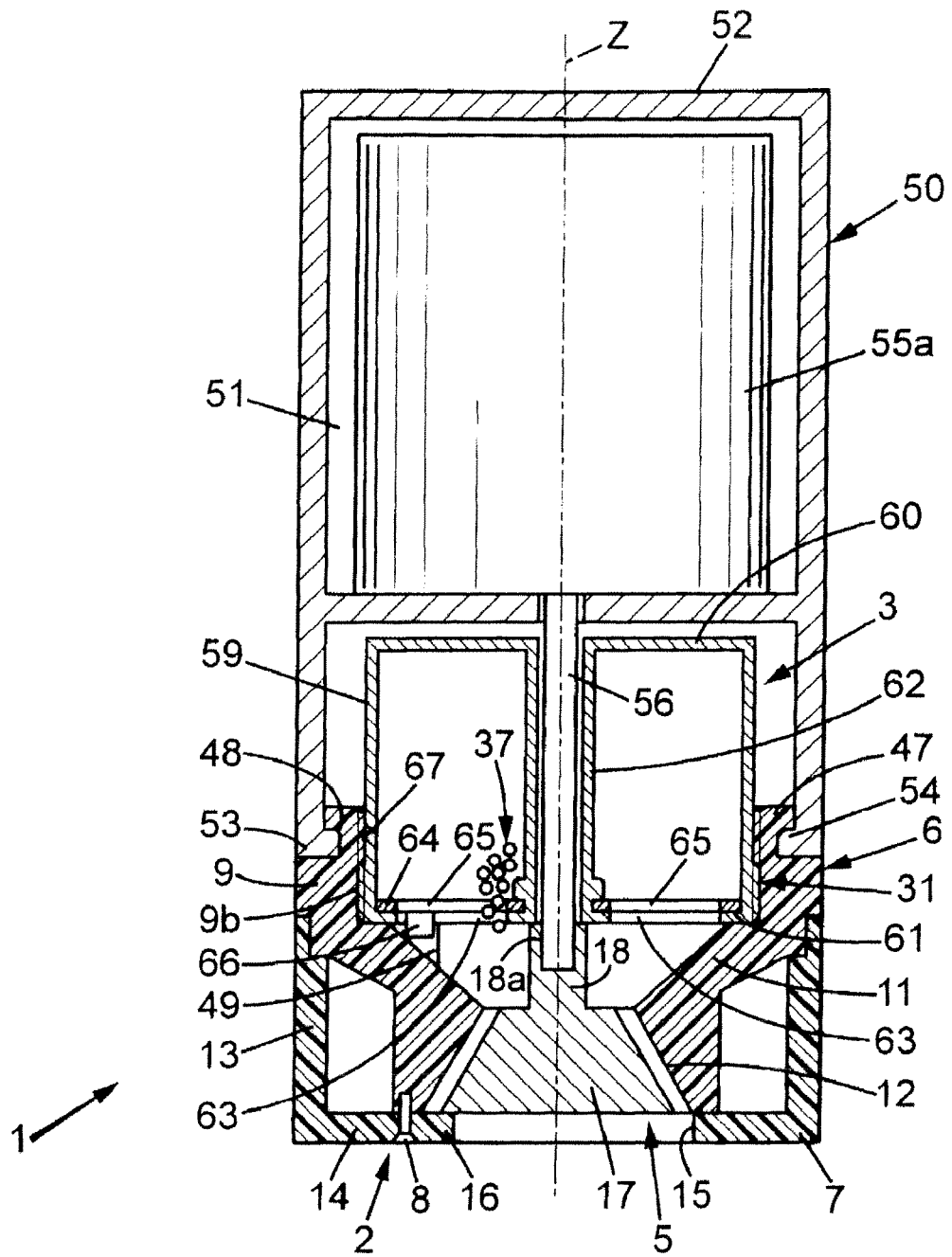
FIG. 18 is a partial section view showing the grinding system of FIG. 17.

As shown on FIGS. 17 and 18, the grinding system according to the third embodiment of the invention further includes a driving mechanism 50 which may be externally shaped as a cylinder of revolution around axis Z having a cylindrical lateral wall 51 extending between an upper end wall 52 and an open lower end 53. The lower end 53 forms an inwardly protruding annular rib 54 adapted to be snap-fitted in the above mentioned groove 48. The driving mechanism includes an electrical motor 55a (FIG. 18) which is actuated by a control button 55 (FIG. 17) which may be fed either by batteries (rechargeable or not) or by the mains. This electrical motor drives (directly or through a transmission gear) a driving shaft 56 which extends along axis Z and protrudes downwardly further than the lower end 53 of the lateral wall 51.

The driving shaft 56 may have a non-circular cross-section, for instance a square cross-section, at least at its lower end, and the transmission shaft 18 of the grinding wheel 17 has an upwardly opening recess 18a (FIG. 18) of the same cross-section, so that the lower end of the driving shaft 56 is adapted to be fitted in said recess 18a to couple the driving shaft 56 with the grinding wheel 17 in rotation around axis Z (the driving shaft 56 and the transmission shaft 18 form together a transmission device).

As shown on FIG. 17, the lateral wall 51 of the driving mechanism 50 is prevented to rotate relative to the housing 4 by any known means, for instance a radial rib 57 which protrudes from the lower end 53 of the lateral wall 51 and which is able to fit into a corresponding groove 58 formed in the lateral wall 9 of the housing 4.

Finally, the reload cartridge 3 of the third embodiment of the invention may have a substantially cylindrical shape, of revolution around axis Z, with a lateral wall 59 extending between an upper end wall 60 and a lower perforated end wall 61. Between the upper end and lower end walls 60, 61, the cartridge 3 further includes a central well 62 which is traversed by the driving shaft 56 when the grinding system is in use.

The perforated lower end wall 61 of the cartridge 3 may include one or several perforations 63, which are here in the number of three, and which, before use (FIG. 17), are closed by a closure member 64, in the form of a perforated disk, which is pivotally mounted around axis Z inside the cartridge 3, in contact with the lower end wall 61 of the cartridge.

The closure member 64 has one or several perforations 65, preferably of same number and same shape as the perforations 63 of the lower end wall 61. Before the cartridge 3 is mounted on the grinding mill 2, the perforations 65 of the closure member are offset from the perforations 63 of the lower end wall 61 of the cartridge, so that the cartridge is closed.

The cartridge may be tightly sealed by the closure member 64 in this closed position, either by having the closure member in tight contact with the lower end wall 61, or by using a thin, tearable plastic film covering the lower end wall 61 and connected to said end wall. The cartridge may also be left unsealed (i.e. note tightly sealed) in the closed position of the closure member 64, so that the internal volume of the cartridge may then communicate with the ambient atmosphere.

The closure member 64 further has a stop member which protrudes downwardly through one of the perforations 63.

Finally, the cartridge 3 further includes at its lower end, an outer thread 67 which is adapted to cooperate with the inner thread 9b of the lateral wall 9, so as to screw the cartridge 3 in the upper recess 31 defined by the lateral wall 9 of the housing 4.

As shown on FIG. 18, the cartridge 3 is partially contained within the lateral wall 51 of the driving mechanism in the normal position of use of the grinding system.

It should be noted that the outer surface of the driving mechanism 50 and/or of complete grinding mill 2, may be covered by an outer cylindrical sheath (not shown).

At least the lower portion of the lateral wall 51 and the lateral wall 60 of the cartridge 3 may be molded out of transparent plastic material, so that the user may see the material to be ground which is left in the cartridge 3.

When a user mounts a new cartridge 3 on the grinding mill 2, by screwing said cartridge in recess 31, the cartridge 3 turns at first with the closure member 64 in the direction of arrow 68 (FIG. 17) until the stop member 66 of the closure member is stopped by the opening member 49 of housing 4. Once the stop member 66 is in abutment against the opening member 49, the closure member 64 is stopped while the rest of the cartridge 3 continues to turn in the direction of arrow 68 due to the threading movement. Therefore, the closure member 64 pivots relative to the perforated lower end wall 61 of the cartridge, until the perforations 65 of the closure member 64 are in register with the perforations 63 of the lower end wall 61, as shown on FIG. 12.

The material to be ground, contained in the cartridge 3, may then flow downward, toward the lower portion of the hopper 11 and toward the grinding mechanism 5.

The user then has to mount the driving mechanism 50 on top of the grinding mill 2 and of the cartridge 3.

To this end, the user inserts the cartridge 3 in the lower opening of the driving mechanism, and the driving shaft 56 of the driving mechanism in the well 62 of the cartridge. The driving mechanism 50 may then be moved along axis Z in the direction of arrow 69 (FIG. 17) until the lower end of the driving shaft 56 may penetrate in the recess 18a of the transmission shaft 18 of the grinding wheel. To enable the coupling between driving shaft 56 and recess 18a, the user may have to turn the driving mechanism 50 around axis Z. Once the transmission shaft 56 is inserted inside the recess 18a, the driving mechanism 50 may be pushed further in the direction of arrow 69, with a possible further rotation of the driving mechanism 50 around axis Z so as to have rib 57 in register with groove 58, after which the driving mechanism 50 may be snap-fitted on housing 4 by penetration of the annular rib 54 of the said driving mechanism inside the annular groove 48 of the housing 4.

Once the grinding system is completely mounted as shown on FIG. 18, the user has just to push on button 55 to have the grinding wheel 17 driven in rotation through transmission shaft 56, so as to grind the material contained in cartridge 3.

To replace the cartridge when it is exhausted, the user has to mount the driving mechanism 50 and then the exhausted cartridge 3, and to mount a new cartridge 3 as explained above.

Figure 19:
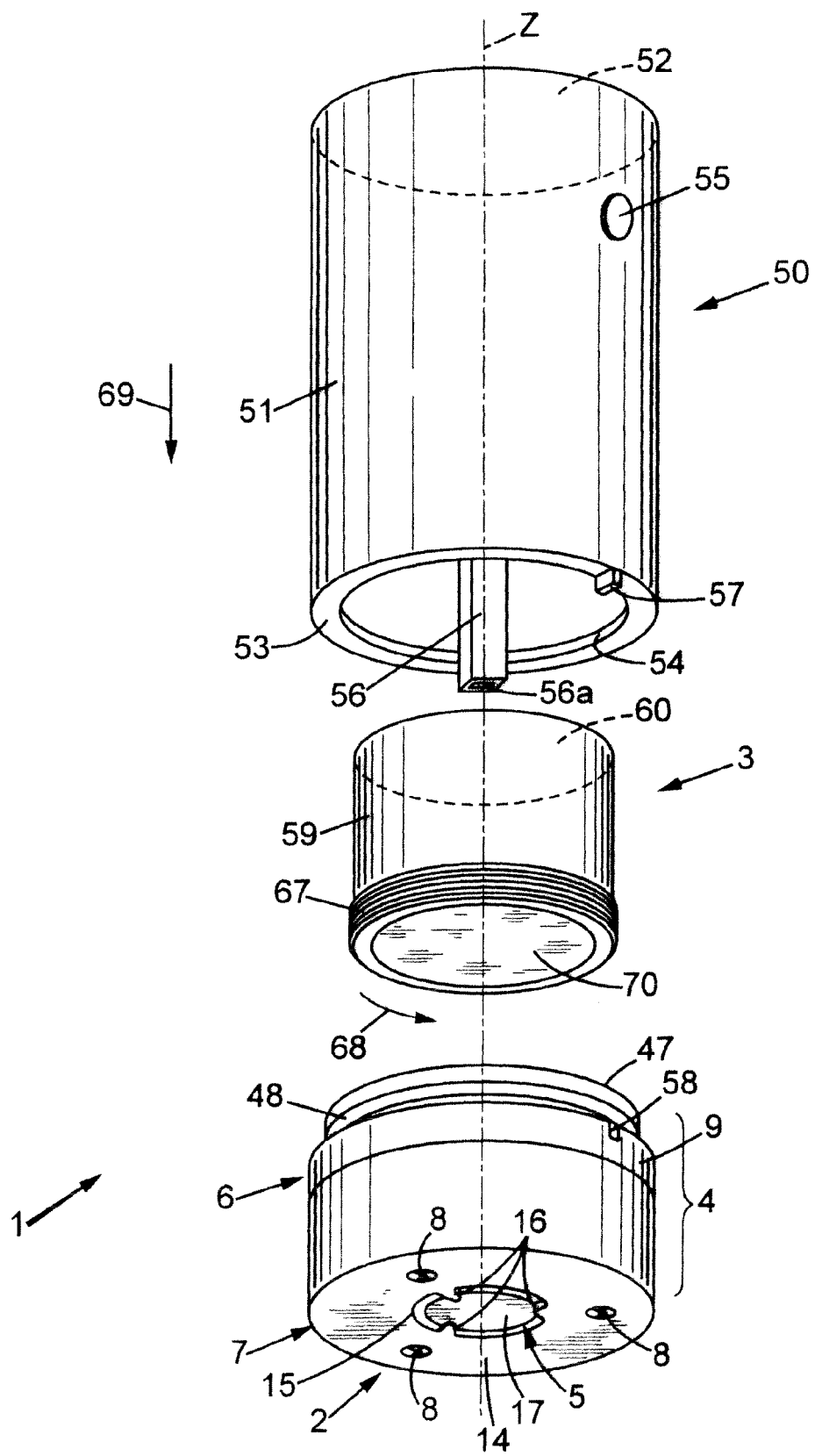
FIG. 19 is an exploded view similar to FIG. 17, in a sixth embodiment of the invention.
Figure 20:
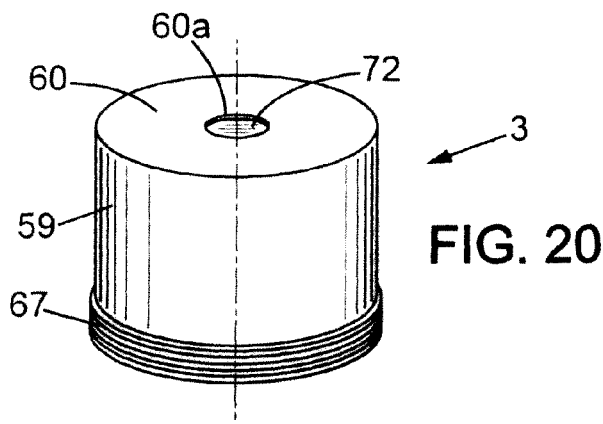
FIG. 20 is a perspective view showing the reload cartridge of the grinding system of FIG. 19.
Figure 21:
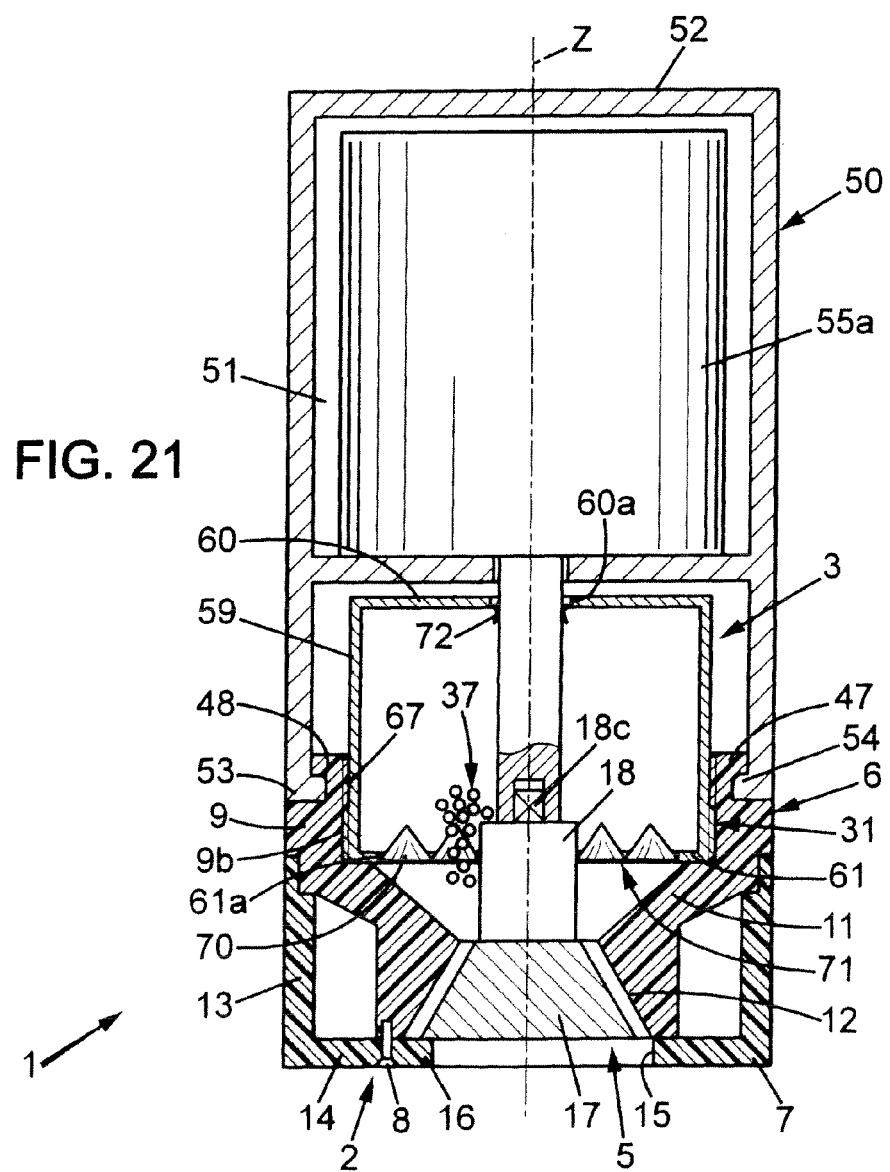
FIG. 21 is a section view similar to FIG. 18, in the sixth embodiment of the invention.
Figure 24:
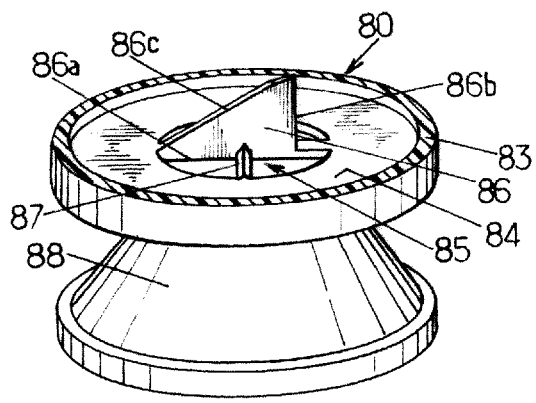
FIG. 24 is a cutaway perspective view of a portion of the grinding mill belonging to the grinding system of FIGS. 22 and 23.

The sixth embodiment of the invention, shown on FIGS. 19-21, is similar to the fifth embodiment described above, except that:
  the transmission shaft 18 of the grinding mechanism 5 goes further upward and is terminated by an upper pin 18c having a non circular cross-section, for instance a square cross-section, of smaller width than the main portion of the transmission shaft 18,
  the lower end wall 61 of the cartridge 3 has a central opening 61a which is closed by a frangible membrane 70 which can be for instance of similar nature as the frangible membrane 41a of the fourth embodiment. The frangible membrane 70 constitutes the closure member of the cartridge 3 and before said cartridge is mounted on the grinding mill 2, the frangible membrane 70 may be flat and may extend radially relative to axis Z. The frangible membrane may be fixed to the lower end wall 61 by welding, gluing or other. The lower end wall 61 of the cartridge could possibly be suppressed, in which case the frangible membrane 70 would be fixed directly to the lower end of the lateral wall 59 of the cartridge,
  the cartridge 3 does not include any central well anymore,
  the upper end wall 60 of the cartridge has a central opening 60a which, before mounting of the cartridge between the grinding mill 2 and the driving mechanism 50, is closed by a frangible membrane 72, which may be of similar nature to the membrane 70 or different, and the driving shaft 56 has a lower recess 56a which is open parallel to axis Z and which has the same inner cross-section as the cross-section of the upper pin 18c of the transmission shaft 18, so as to be able to fit over said upper pin 18c.

Before the cartridge 3 is mounted between the grinding mill 2 and the driving mechanism 50, the internal volume of said cartridge is closed by the membranes 70, 72. Said internal volume may then be either tightly sealed and kept under controlled conditions as explained above, or left in communication with the ambient atmosphere.

When a new cartridge 3 has to be mounted on the grinding mill 2, it is first screwed to the housing 4 of the grinding mill 2, as explained above for the fifth embodiment. During this movement, the transmission shaft 18 of the grinding mechanism, which protrudes upward, ruptures (breaks) the frangible membrane 70, thus completing the coupling of the cartridge 3 to the grinding mill and leaving a central opening 71 which enables the material 37 to be ground to flow downward, toward the grinding mechanism 5.

Besides, when the driving mechanism 50 is then mounted on the grinding mill 2, the driving shaft 56 perforates the membrane 72 and penetrates inside the cartridge 3 until it fits over the upper pin 18c of transmission shaft 18. To enable the recess 56a of driving shaft 56 to fit over the upper pin 18c, a certain amount of rotation of the driving mechanism 50 around axis Z may be necessary.

Further, the lower rib 57 of the driving mechanism is inserted in the upper groove 58 of the driving mill as already explained above in the fifth embodiment, and then the lower end 53 of the lateral wall 51 of the driving mechanism is fitted on the housing 4 of the grinding mill, as also explained above with regard to the fifth embodiment of the invention.

In the seventh embodiment of the invention, as shown on FIGS. 22 and 23, the grinding system 1 has a substantially cylindrical general shape, having a central axis of revolution Z. This grinding system includes a grinding mill 2 and a disposable cartridge 3 containing the material to be ground. The cartridge 3 is adapted to be coupled to the grinding mill 2 to feed said grinding mill with material to be ground during use (i.e. the cartridge 3 remains mounted on the grinding mill 2 during use of the grinding mill, until the cartridge 3 is emptied and replaced by a new cartridge).

The grinding mill 2 includes a housing 4 which, in this seventh embodiment, comprises three parts:
a main body 80,
a bottom part 81,
and a cover 82.

Figure 25:
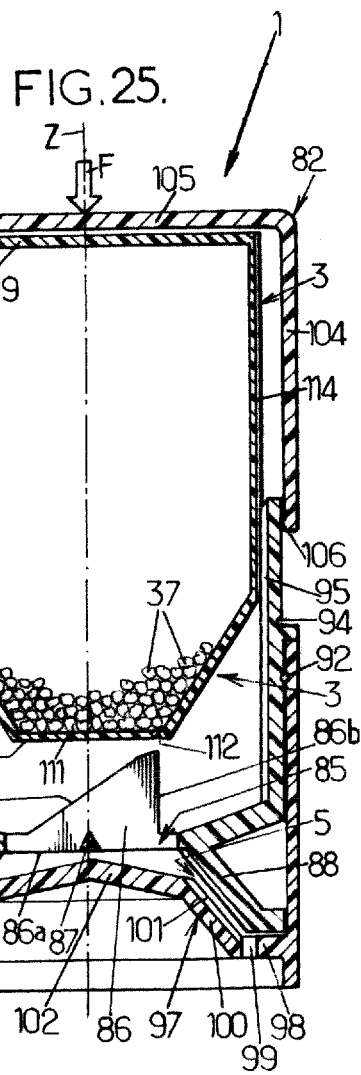
FIG. 25 is a vertical cross section of a cartridge belonging to the grinding system of FIGS. 22 and 23.
Figure 35:
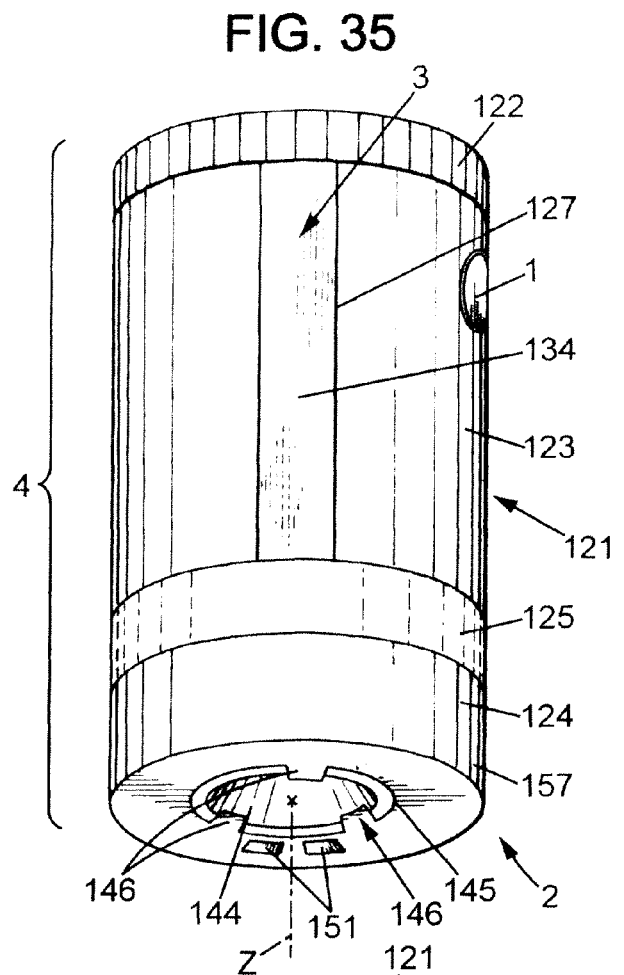
FIG. 35 is a perspective view of the grinding system of FIG. 32, without its base.

The main body 80 may have a general cylindrical shape centered on axis Z, including a cylindrical lateral wall which is open at its upper ends and which, at its lower end, is extended inwardly by a bottom 84 which may be slightly conically shaped and may converge toward the central opening 85 which can be seen on FIGS. 35 and 25.

The main body 80 may be molded as a single piece out of plastic material, for instance out of polyoxymethylene, e.g. out of Delrin®. This plastic material may for instance be substantially transparent.

An opening member 86, in the form of a vertical rib, may be molded as a single piece with the bottom 84 across the central opening 85 and protrudes upwardly from the bottom 84 inside the lateral wall 83.

The opening member 86 may for instance have a substantially triangular shape, having a lower edge 86a which is substantially perpendicular to the central axis Z, a side edge 86b which is substantially parallel to the axis Z, and an upper edge 86c which extends slantwise.

The opening member 86 may be reinforced by a transverse rib 87 which is also molded as a single piece with the bottom 84 and the opening member 86, and which extends transversely to the opening member 86 in the central opening 85, flush with the bottom 84.

In the seventh embodiment of the invention, the bottom 84 of the main body is extended downward by a diverging frustoconical wall 88 which includes an inner conical toothing 89 (see FIGS. 33 and 35).

Finally, the lateral wall 83 of the main body 81 may also include:
an annular flange 90 which extends radially from said lateral wall 83,
an annular groove 91 in which a metallic circlip 92 may be lodged (see FIGS. 22 and 23), the groove 91 being situated between the outer flange 90 and the lower end of the lateral wall 83,
an outer axial rib 93 which extends outside the lateral wall 83 parallel to the central axis Z from the outer flange 90 to the upper end of the lateral wall,
an outer, substantially peripheral groove 94 which is hollowed out in the outer surface of the lateral wall 83 above the flange 90 (this groove 94 is interrupted by the outer rib 93 and is therefore not completely annular),
and an inner axial rib 95 which extends parallel to the central axis Z on the internal surface of the lateral wall 83.

The bottom part 81 of the housing 4 may be molded as a single piece out of plastic material e.g. substantially transparent plastic material. Such plastic material may be for instance polyoxymethylene, e.g. Delrin®.

As shown in FIGS. 22, 23 and 25, the bottom part 81 of the housing 4 includes a cylindrical outer wall 96 having an open upper end and extended inwardly, in the area of its lower end, by a bottom portion 97. The bottom portion 97 may include, for instance, an annular inner collar 98 which extends substantially radially inwardly from the lateral wall 96 and may include passages 99 for the ground material. The collar 98 is extended inwardly by a substantially frustoconical wall 100 having an outer conical toothing 101. The frustoconical wall 100 is itself extended inwardly by a top portion 102, so that the only openings of the bottom portion 97 are the above mentioned passages 99.

The lateral wall 96 of the bottom part 81 further includes an inner annular groove 103. The lateral wall 96 of the bottom portion 81 is fitted on the lateral wall 83, in such a way that the above mention annular grooves 91, 103 are facing each other. The bottom part 81 is retained on the main body 80 by the circlip 92 which protrudes in both grooves 91, 103 when the bottom part 81 is fitted on the main body 80.

When the bottom part 81 is fitted on the main body 80, the inner toothing 89 of the main body and the outer toothing 101 of the bottom part are facing each other with clearance, so that the main body can freely rotate around axis Z relative to the bottom part 81 and so that the material to be ground can penetrate between the two toothings 89, 101 and be ground by said toothings forming together a grinding mechanism 5.

The cover 82 may be molded out of plastic material and includes a cylindrical lateral wall 104 having an open lower end and being extended by a top portion 105 covering the cartridge 3 at its upper end. The lateral wall 104 of the cover includes, near its lower end, a substantially annular internal rib 106. Further, the lateral wall 104 also includes an inner axial groove 107 which extends parallel to axis Z from the lower end of the lateral wall. This axial groove interrupts locally the inner rib 106, so that this inner rib is not totally annular.

The cover 82 can be removably snap-fitted on the main body 80, by pressing said cover 82 in the direction of arrow F, while inserting the axial rib 93 of the main body in the axial groove 107 of the cover, until the inner rib 106 of the cover penetrates inside the outer groove 93 of the main body. Once the cover 82 is snap-fitted on the main body 80, as shown on the FIG. 28, the cover 82 drives the main body 80 in rotation around axis Z, thanks to the fitting of axial rib 93 in axial groove 107.

As shown on FIGS. 22, 23 and 25, the cartridge 3 may be molded out of plastic material, for instance in two parts which are assembled together by ultrasonic welding (the cartridge is shown as one part after welding in the drawings). The material forming the cartridge 3 may be transparent, so that the material to be ground can be seen through the wall of said cartridge.

Figure 26:
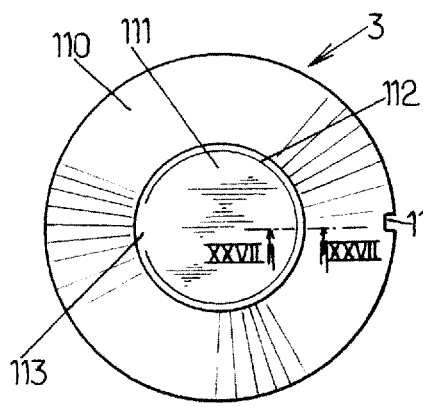
FIG. 26 is a bottom view of the cartridge of FIG. 25.
Figure 27:
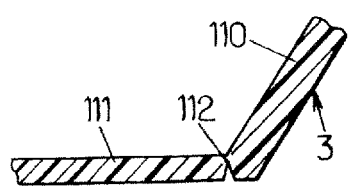
FIG. 27 is a cross section along line XXVII-XXVII of FIG. 26.

The cartridge 3 may include:
a cylindrical lateral wall 108, which is extended at its upper end by a closed top portion 109 and which is extended at its lower end by a converging frustoconical wall 110. The frustoconical wall 110 is closed at its lower end by a bottom 111 which extends perpendicular to axis Z. The bottom 111 includes a peripheral weakened line 112 which is clearly visible on FIGS. 26 and 27. This weakened line may be in the form of an arc of the circle and may extend on most of the periphery of the bottom 111 except in an area 113. The weakened line 112 may for instance consist in a groove made in the thickness of the bottom 111.

Due to the weakened line 112, the bottom 111 forms a frangible closure member which may be opened by breaking the weakened line 112, so that said closure member 111 may then pivot around the area 113 having no weakened line, said area 113 thus forming a hinge for the closure member.

The lateral wall 108 of the cartridge may further include an axial groove 114 in which the axial rib 95 of the main body 80 is inserted when the cartridge 3 is inserted in the upwardly open recess formed by the main body 80, as shown on FIG. 25.

Due to the insertion of the inner rib 95 in the axial groove 114, the cartridge 3 is angularly oriented around axis Z, so that the area 113 of the closure member 111 is located opposite the apex of the opening member 86 of the main body.

Figure 28:
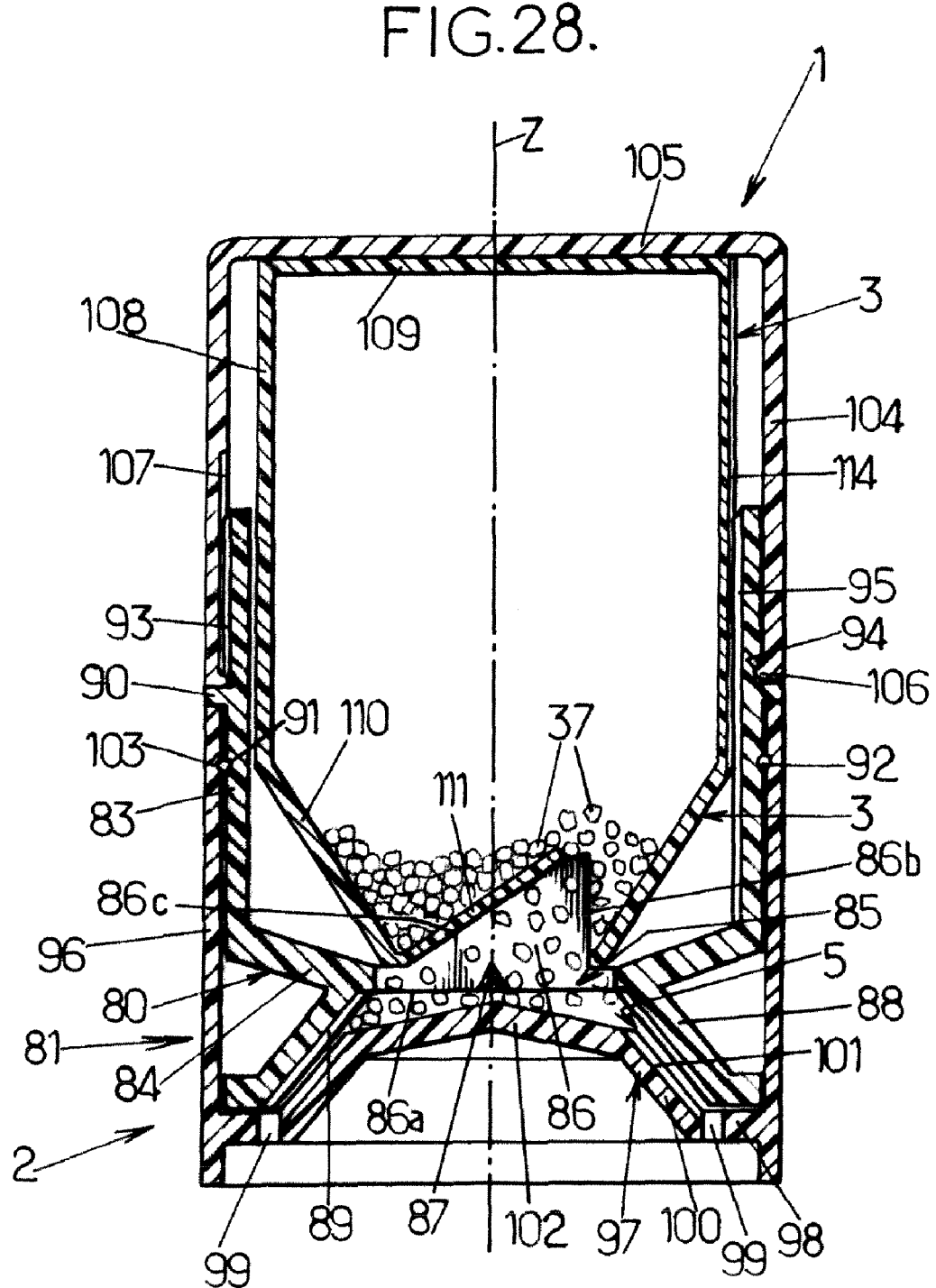
FIG. 28 is a section view similar to FIG. 25, showing the grinding system after coupling of the cartridge to the grinding mill.

Therefore, when the cover 82 is fitted on the main body 80 on top of the cartridge 3 and is pressed downward in the direction of arrow F of FIG. 25, the cover 82 pushes the cartridge 3 downward toward the opening member 86 and the opening member 86 presses on the closure member 111 and opens said closure member 111 as shown on FIG. 28.

Therefore, the material 37 to be ground, initially contained in the cartridge 3, may flow toward the grinding mechanism 5 formed by the toothings 89, 101 and may be ground when the cover 82 is turned around axis Z relative to the bottom part 81 of the grinding mill.

The eighth embodiment of the invention, shown on FIGS. 29-31, has a grinding mill 2 which is similar to that of the seventh embodiment, so that the eighth embodiment will not be described in details, and only the differences distinguishing the eighth embodiment from the seventh embodiment to will be described hereunder.

In the eighth embodiment of the invention, the housing 4 of the grinding mill still includes three parts, to with a main body 80, a bottom part 81 and a cover 82. The main body 80 is similar to that of the seventh embodiment, except that:
the opening 85 in the bottom 84 does not include the opening member 86 or transverse rib 87,
the lateral wall 83 does not include the inner axial rib 95,
and said lateral wall 83 further includes an inner shoulder 115 near the bottom 84.

Besides, the bottom part 81 may be identical to the bottom part of the seventh embodiment, whereas the top 105 of the cover 82 may include for instance a cylindrical wall 116 protruding axially inside the lateral wall 104, said cylindrical wall 116 being extended inwardly by a transverse wall forming a pusher 117.

Figure 29:
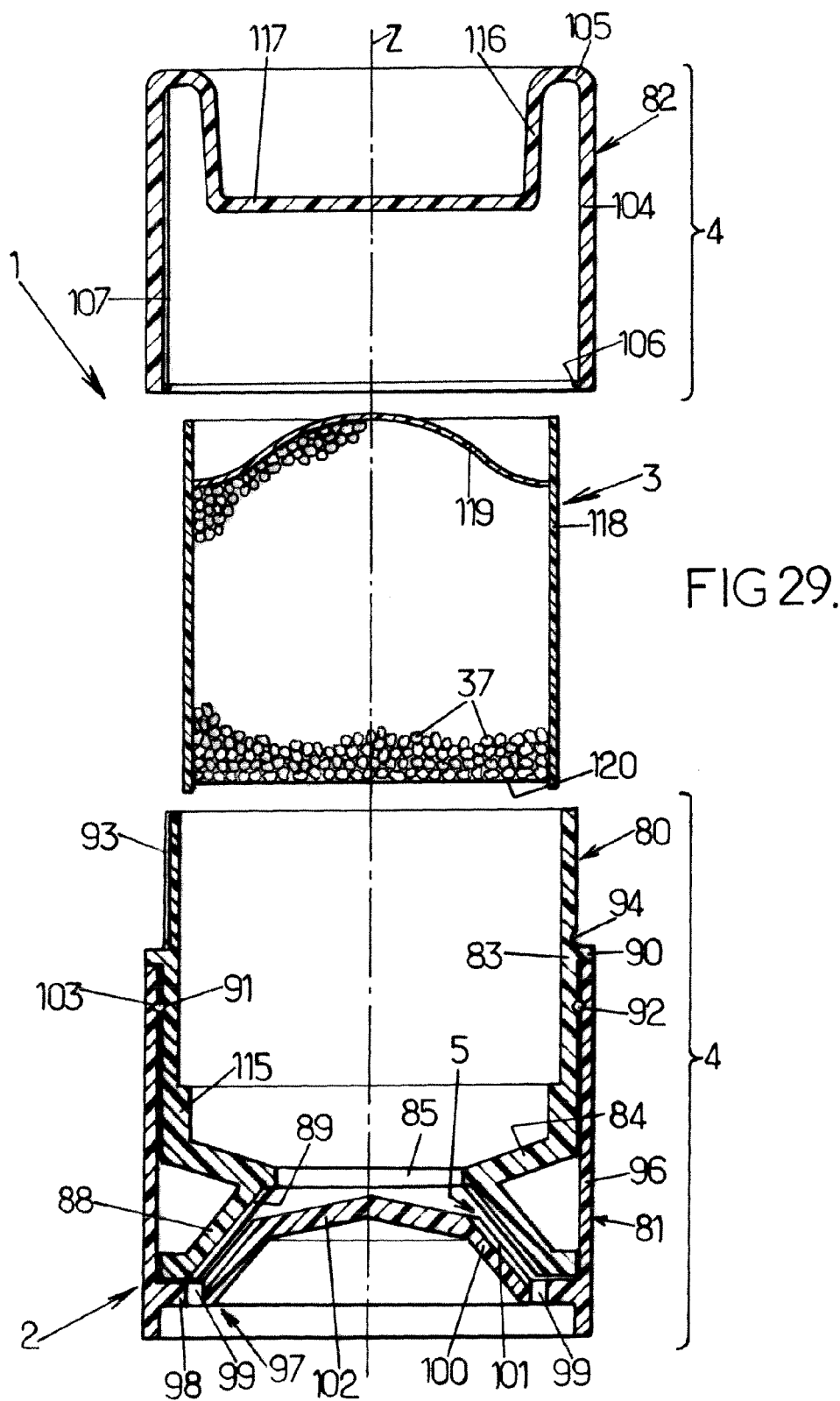
FIG. 29 is an exploded view of a grinding system according to an eighth embodiment of the invention, in vertical cross section.

The grinding system 1 of FIG. 29 further includes a disposable cartridge 3 which may for instance include a lateral cylindrical wall 118 made out of plastic material, for instance transparent material. This lateral wall 118 is closed, in the area of its upper end, by a deformable wall 119, for instance a membrane made out of flexible synthetic material. The deformable wall 119 may be in the form of bellows or in any other form enabling to push said deformable wall downward without creating substantial tensions in said deformable wall. For instance, the deformable wall 119 may form a boss protruding upwardly before use of the cartridge 3, as shown on FIGS. 29 and 30.

Further, in the area of the lower end of the lateral wall 118, the cartridge 3 includes a frangible membrane 120 which tightly seals the internal volume of the cartridge 3 before use of said cartridge. The frangible membrane 120 may be a metallic membrane or a plastic membrane or a multi-layer membrane, the periphery of which is fixed to the lower end of the lateral wall 118. The frangible membrane may seal tightly the internal volume of the cartridge 3.

All the internal volume of the cartridge 3 may be full of the material 37 to be ground.

When a user wishes to use a new cartridge 3 in the grinding mill 2 of the eighth embodiment of the invention, he or she inserts the cartridge 3 inside the internal recess defined by the lateral wall 83 of the main body 80, and then inserts the cover 82 on the main body 80, on top of the cartridge 3. When the user presses on the cover 82 in the direction of arrow F of FIG. 30, the pusher 117 of the cover pushes on the deformable membrane 119, so that the material 37 contained in the cartridge (and the gas contained in this cartridge) is pushed downward and finally breaks the lower frangible membrane 120, as shown on FIG. 31, thus completing the coupling of the cartridge on the grinding mill 2 in the recess upper of the main body 80 which is closed by the cover 82. The material 37 may then flow toward the grinding mechanism 5 and can be ground by turning the cover 82 around axis Z relative to the bottom part 83.

In the ninth embodiment of the invention, shown on FIGS. 32-37, the grinding system 1 includes a motorized grinding mill 2 having a housing 4 which is substantially cylindrical in shape, with a central axis Z. As shown on FIGS. 22 and 25, the housing 4 may include a main body 121, having, at its upper end, a removable cover 122 which may be for instance screwed at the upper end on the main body 121 or which may be removably attached to said upper end by any other means.

Figure 37:
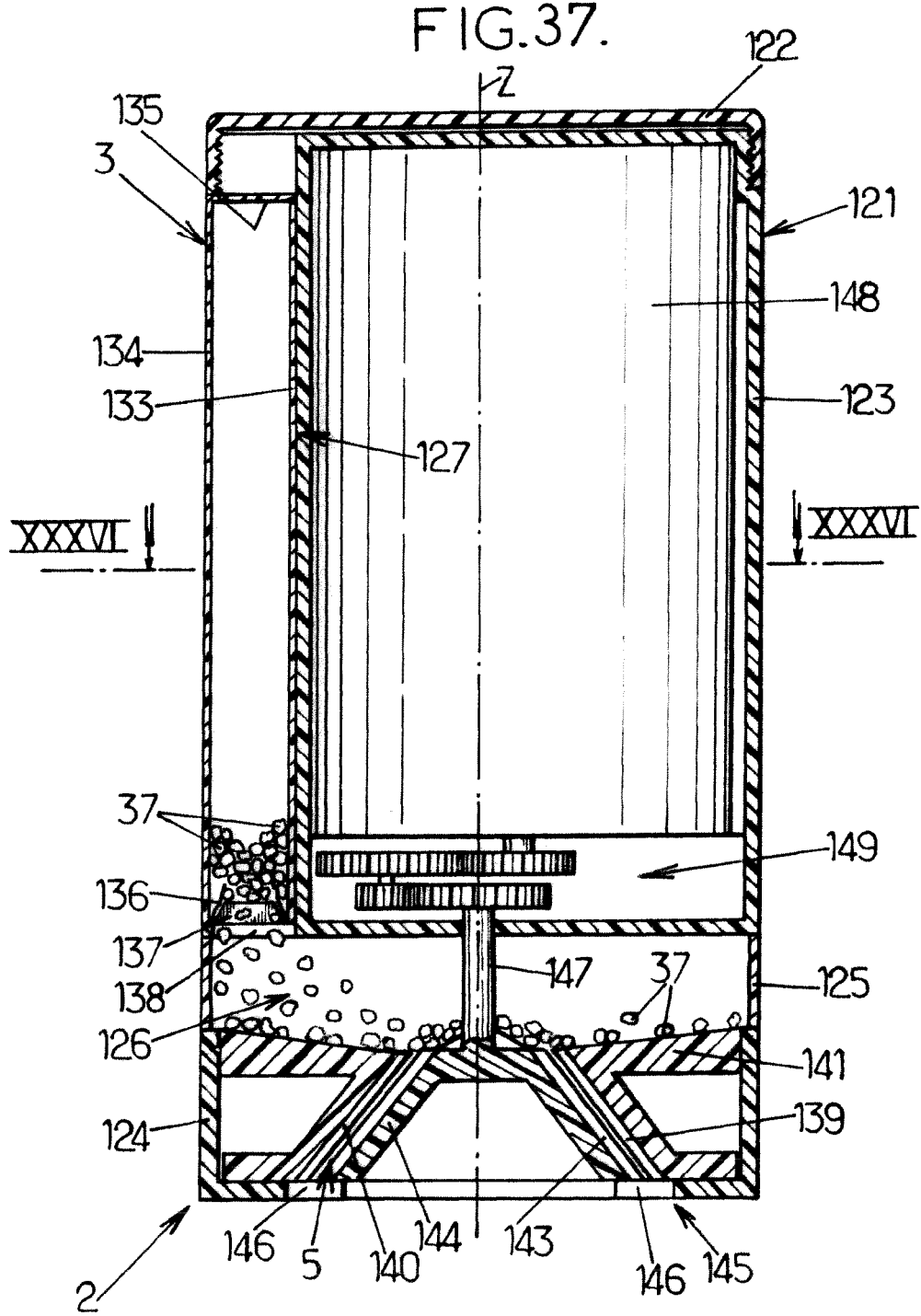
FIG. 37 is a vertical cross section of the grinding system of FIG. 35, the cross section being taken along line XXXVII-XXXVII of FIG. 36.
Figure 38:
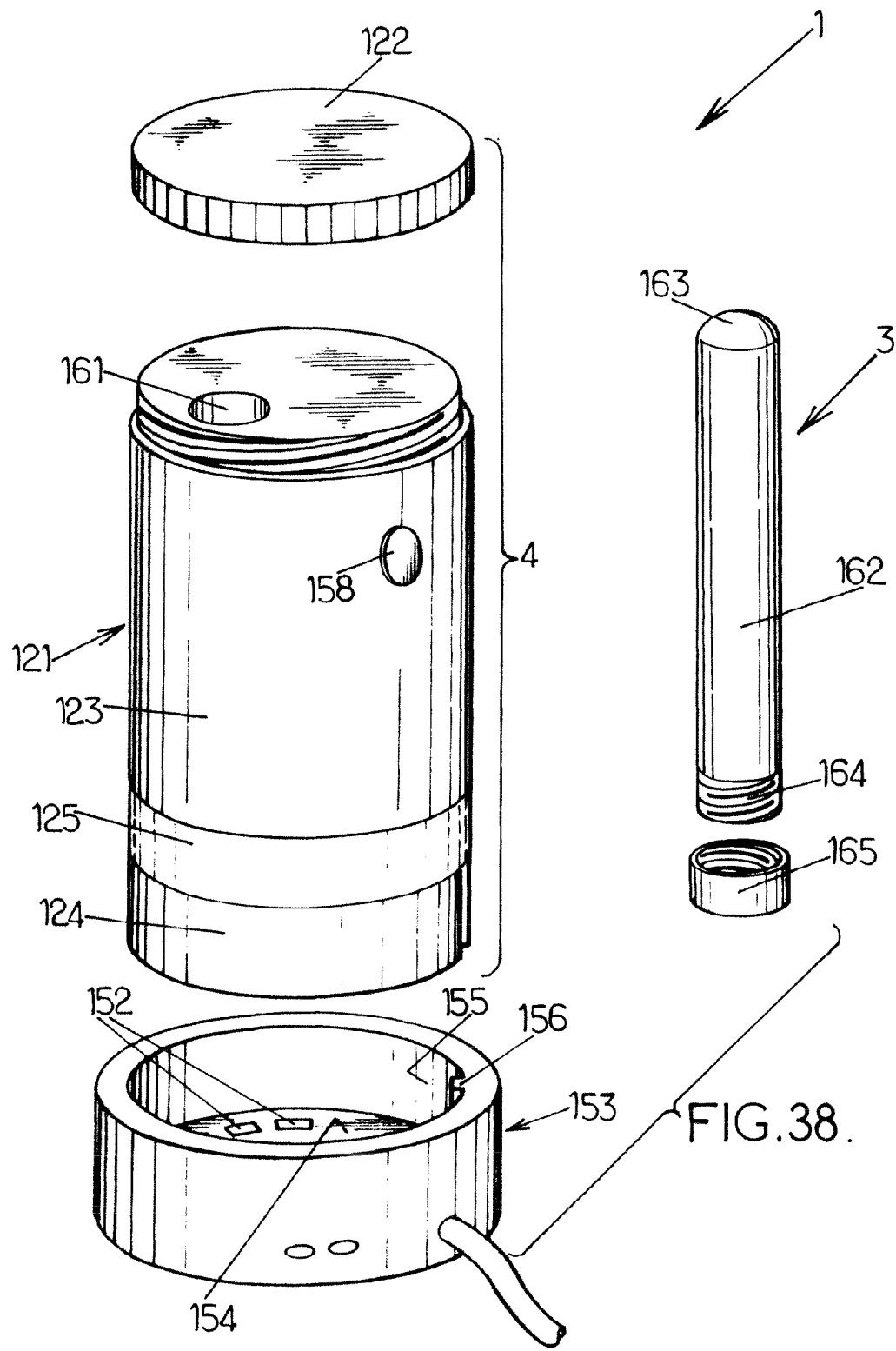
FIG. 38 is an exploded perspective view of a grinding system according to a tenth embodiment of the invention.
Figure 41:
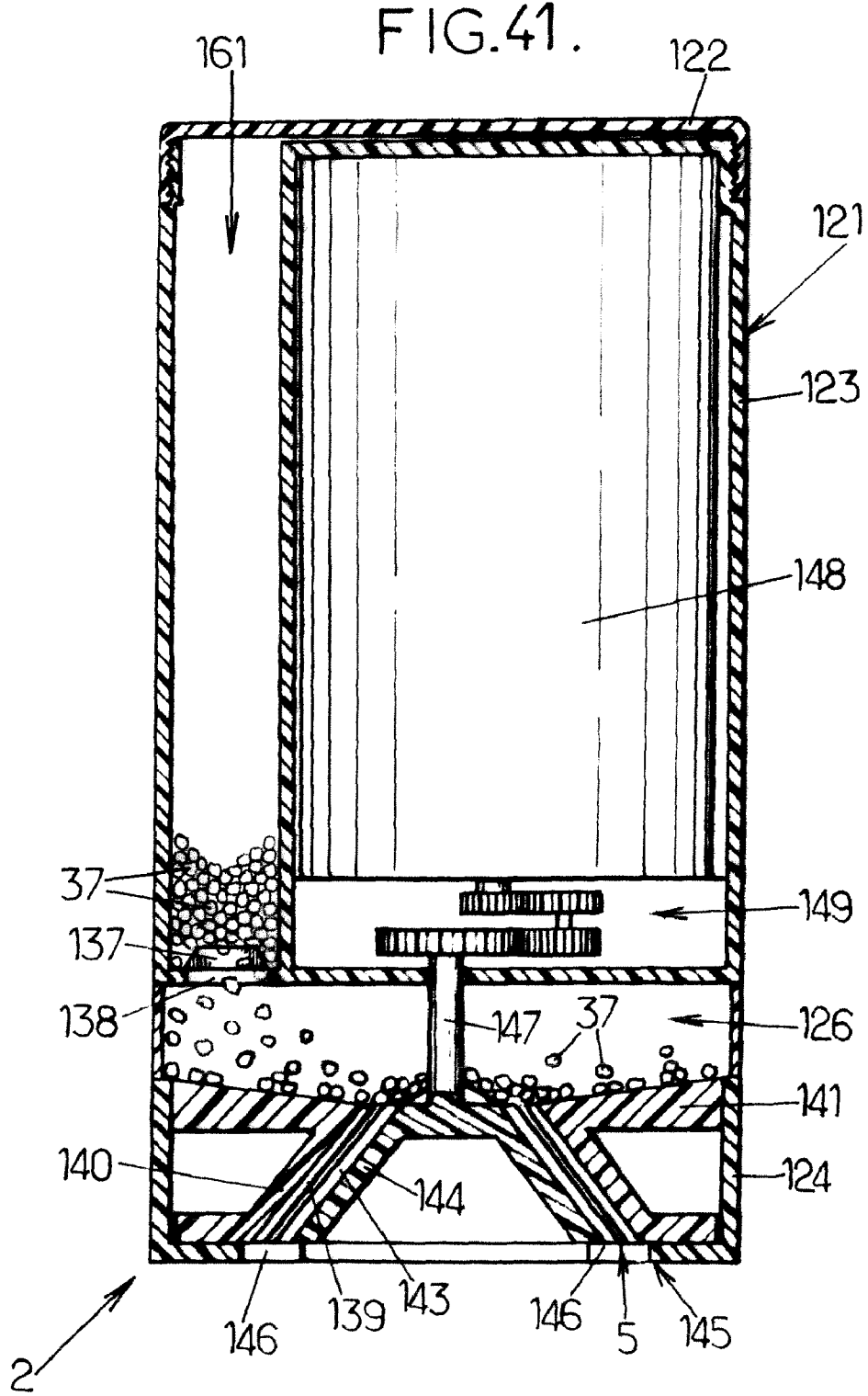
FIG. 41 is a view similar to FIG. 40, showing the grinding mill in its position of use, after removal of the cartridge.

The main body may include upper and lower portions 123, 124, which may be made out of opaque plastic material and an intermediate portion 125 comprising a lateral wall made out of transparent plastic material and defining a hollow internal container 126 which is shown on FIG. 37 and which is able to receive material 37 to be ground.

Figure 36:
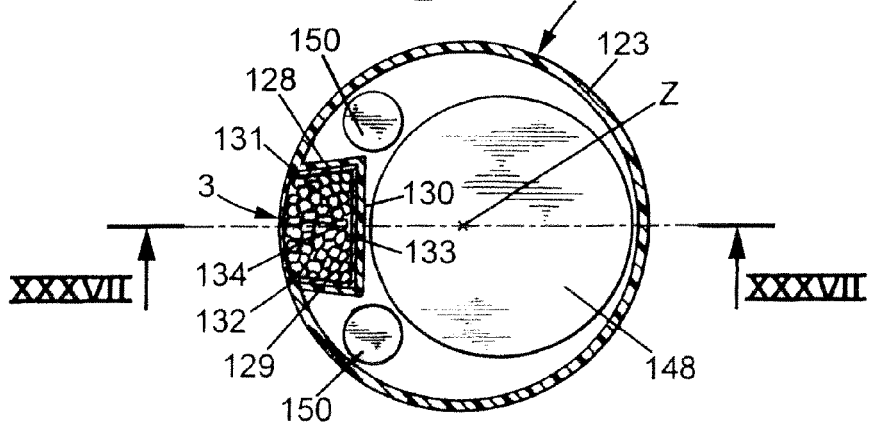
FIG. 36 is a horizontal cross section of the grinding section of FIG. 35, the cross section being taken along line XXXVI-XXXVI of FIG. 37.

As shown for instance on FIGS. 32 and 36, the upper portion 123 of the main body 121 may include at its outer periphery, a slot 127 which extends parallel to axis Z and which opens upwardly and outwardly. The slot 127 receives a disposable cartridge 3 containing material to be ground, said disposable cartridge having a shape which is complementary to the inner shape of the slot 127.

Preferably, the shape of the slot 127 and cartridge 3 is such that cartridge 3 is held inside slot 127 by fitting.

For instance, the slot 127 may have a substantially trapezoidal shape, with:
- two lateral faces 128, 129 which diverge toward the inside of the housing 4,
- and an inner face 130 which may be flat or not.

The cartridge 3 may then include:
- two lateral faces 131, 132 corresponding respectively to the lateral faces 128, 139,
- an inner face 133 corresponding to the inner face 130,
- and an outer face 134 which may have the shape of a portion of a cylinder and which may be in continuity with the outer shape of the main body 121 of the housing 4.

Figure 34:
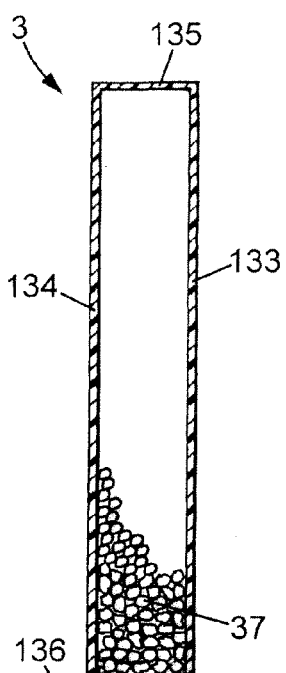
FIG. 34 is a vertical cross section of the cartridge of FIG. 33.

As shown on FIGS. 33 and 34, the cartridge 3 further includes a top 135 and a bottom 136. The top 135 and the faces 131-134 may be for instance molded as one single piece out of transparent plastic material so that the material 37 to be ground, contained in the cartridge 3, can be seen by a user. The bottom 136 may be formed by frangible membrane which may be metallic or plastic or which may be a multilayer membrane.

As shown on FIGS. 32 and 37, when the cartridge 3 is fully inserted in the slot 137, the frangible membrane 136 is broken by an opening member 137 which may be formed as a vertical rib belonging to the upper portion 123 of the main body of the housing and which protrudes upwardly from a passage 138 through which the slot 127 communicates with the inner container 126. Therefore, when the cartridge 3 is fully inserted in the slot 127, as shown on FIG. 37, the frangible membrane 136 is pressed parallel to axis Z against opening member 137 and is broken by said opening member 137, so that the material 37 contains in the cartridge may flow inside the inner container 126 of the housing 4. Once coupled to the grinding mill 2, the cartridge 3 may be held in place for instance by the cover 122 (FIG. 37).

In the ninth embodiment of the invention, the grinding mechanism 5 may be comprised within lower portion 124 of the main body of the housing and may include, for instance:
- an inner conical toothing 139 which may belong to a bottom part 140, said bottom part being rigid with the lower portion 124 of the housing and defining a bottom 141 of the inner container 126, converging downwardly toward a central opening 142,
- and an outer conical toothing 143 which is borne by a frustoconical wheel 144 mounted in said opening 142, a clearance been left between the toothings 139, 143.

The bottom part 140 may be fixed to lower portion 124 of the main body 121 by any means, for instance by ultrasonic welding, or may be molded in one piece with said lower portion 124. Further, said lower portion 124 forms, under the frustoconical wheel 144, a central opening 145 which enables the passage of ground material downward when the grinding mill is actuated. The lower portion 124 of the main body 121 of the housing may also include radially inwardly extending tabs 146 which extend under the frustoconical wheel 144 to maintain said frustoconical wheel in position (see FIGS. 35 and 37).

As shown on FIG. 37, the frustoconical wheel 144 is driven by a shaft 147 which is itself driven by an electric motor 148 through a reduction gear 149.

As shown on FIG. 36, the motor 148 is off-centered relative to axis Z and the remaining empty space inside the upper portion 123 of the main body 121 of the housing may be used to contain one or several batteries 150. Such batteries may be rechargeable batteries, in which case the lower portion of the housing may include electrical contacts 151 which are adapted to connect respectively to electrical contacts 152 of a charging base 153 connected to the mains.

The charging base 153 may for instance be cup-shaped, with a bottom 154 and an annular lateral wall 155 inside which the lower portion 124 of the housing 4 of the grinding mill may fit for the purpose of charging the batteries 150. The outer shape of the bottom portion 124 and the inner shape of the lateral wall 155 of the base are such that the grinding mill 2 is oriented angularly around axis Z when fitted on the base 153, such that the electrical contacts 151, 152 are then in register. For instance, the lateral wall 155 of the base may include an axial rib 156 which is inserted in a corresponding axial slot 157 of the bottom portion 124.

To grind the material 37 contained in the cartridge 3 and the internal container 126, the motor 148 is actuated through an actuating button 158.

Further, the grinding mill 2 may include means for avoiding actuation of the motor 148 if a cartridge 3 is not present in the slot 127. To this end, the cartridge 3 may for instance be used to close an electrical circuit. For instance, one of the faces of the slot 127 (e.g. the axial face 128) may include two electrical contacts 159 which, when a cartridge 3 is inserted in the slot 127, are bridged by an electrical contact 160 born by the corresponding face (e.g. the face 131) of the cartridge 3 to close said electrical circuit, thus enabling the motor to be actuated. Similarly, the grinding mill 2 may have means for disabling the motor 148 unless the cover 122 is mounted on the upper portion 123 of the housing 4. For instance, the upper portion 123 of the housing and the cover 122 may have electrical contacts (not shown) for opening the electrical circuit of the motor 148 when the cover 122 is not in place and for closing such circuit when the cover is in place.

When all the material 37 to be ground has been consumed by the grinding mill 2, the user has to take off the cover 122 and extract the cartridge 3, which is made easy by the fact that the outer face 134 of the cartridge is part of the external surface of the grinding mill. Then a new cartridge 3 is inserted in the slot 127 and the frangible membrane 136 of this new cartridge is broken by the opening member 137, after which the cover 122 may be put back in place and the grinding mill 2 may again be used.

The tenth embodiment of the invention, which is shown on FIGS. 38-41, is similar to the ninth embodiment and will therefore not be described in details. Only the differences of the tenth embodiment compared to the ninth embodiment will be described hereafter.

In the tenth embodiment of the invention, the charging base 153 may be identical or similar to the ninth embodiment and the housing 4 and grinding mechanism 5 may also be similar to the ninth embodiment, except that the slot 127 of the upper portion 123 of the housing may be replaced by a cylindrical vertical well 161 which is open at its upper end and which, at its lower end, communicates with the above mentioned passage 138, said passage 138, being fitted with the above mentioned opening member 137.

Further, as shown on FIGS. 28 and 29, the disposable cartridge 3 may then be in form of a cylindrical tube with a lateral wall 162 having a substantially complementary shape to the well 161, for instance a cylindrical shape of circular cross section, said lateral wall 162 extending between a closed top 163 and an open lower end which is closed by a frangible membrane 166, for instance a metallic membrane or a plastic membrane or a multilayer membrane which tightly seals the material 37 to be ground contained in the cartridge 3. The lower end of the lateral wall 162 may have an outer thread 164 on which a protector 165 may be screwed while the cartridge 3 is stored (the protector 165 could be simply fitted on the lower end of the cartridge 3, or maintained on said lower end by any other means).

In the tenth embodiment of the invention, when a user wants to feed material 37 to be ground in the internal container 126 of the grinding mill 2, he or she takes off the cover 122 of the grinding mill and inserts the disposable cartridge 3 without its closure member 165, in the well 161, so that the frangible membrane 166 of said cartridge is broken by the opening member 137 and the material 37 contained in said cartridge flows in the internal container 126 of the grinding mill 2.

In this position, as shown on FIG. 40, the upper end of the cartridge 3 protrudes upwardly from the upper portion 123 of the housing 4. Once the cartridge 3 has been opened by opening member 137 and the material 37 of said cartridge has flowed in the internal container 126, the user takes off the cartridge 3 and puts back the cover 122 on the upper portion 123 of the main body 121 of the housing 4, after which the grinding mill 2 is ready for use.

In variants of the ninth and tenth embodiments, the cartridge 3 could be inserted laterally in the housing 4 rather than parallel to axis Z.

In the eleventh embodiment of the invention, shown on FIGS. 42-46, the grinding system 1 includes a motorized grinding mill 2 having a housing 4 which is substantially cylindrical in shape, with a central axis Z. As shown on FIGS. 42 and 44, the housing 4 may include a main body 170 which may be made out of plastic material, possibly in several pieces assembled together. The main body 170 has a lateral wall 171 of substantially cylindrical form, centered on axis Z, this lateral wall 171 being hollowed out by an open window 172 which extends longitudinally parallel to axis Z from the top end of the lateral wall 171 down to a point which is near the lower end of said lateral wall.

The main body 170 also includes an internal wall 173 which defines a motor housing 174 in which an electric motor 148 is received.

The lateral wall 171 of the main body 170 extends vertically between an open lower end and an upper end which is extended inwardly by a top portion 175 which is substantially perpendicular to axis Z. The top portion 175 closes the upper end of the motor housing 174, the lower end of said motor housing being closed by a transverse wall 176 parallel to said top portion 175.

The top portion 175 includes an opening 177 which is situated near said window 172 of the lateral wall 171.

This opening communicates with a slide 178 extending longitudinally parallel to axis Z from said opening 177 down to an open lower end. The slide 178 may include for instance two lateral slots 179 formed in two opposed lateral vertical portions 180 of the main body 170 near said internal wall 173.

Near the lower end of the slide 178, a stop member 181 which is rigid with the internal wall 173, protrudes from said internal wall 173 between the two slots 179.

The top portion 175 of the main body 170 may be covered by a cover 181 which may be pivotally mounted on the main body 170 so as to be able to rotate around axis Z, in the direction of the double arrow 182 of FIG. 42.

The cover 181 may be fixed to the main body 170 by any known means, for instance by snap fitting, or other. The cover 181 includes an opening 183 which may be placed in registered with the opening 176 of the main body.

The housing 4 also includes a lower portion 184 which may be rigidly fixed to the main body 170 by any known means, for instance by fitting and/or ultrasonic welding.

As shown on FIG. 44, the lower portion 184, which may be for instance molded out of plastic material as a single piece, may be a cup shaped part including an annular lateral wall 185 which is extended at its lower end by a bottom 186 defining a central opening 187. The bottom 186 may be extended radially inwardly by inner tabs 188.

Between the main body 170 and the lower portion 184, the housing may include an intermediate portion 189 which may be for instance be fitted inside the lateral walls 171, 185 of the main body and of the lower portion respectively, said intermediate portion 189 being in axial abutment between the transverse wall 176 of the main body and the bottom 186 of the lower portion.

The intermediate portion 189 may be molded out of plastic material, for instance polyoxymethylene, e.g. out of Delrin®.

The intermediate portion 189 may form an upwardly open cup 190 which is applied under the transverse wall 176 and which receives a reduction gear 149 driven by the electric motor 148.

The intermediate portion 189 also forms downwardly converging hoper 191 which is itself extended downwardly by a diverging frustoconical wall 192 including an inner conical toothing 193.

This inner conical toothing 193 forms the grinding mechanism 5 with an outer conical toothing 143 which is borne by a frustoconical wheel 144 mounted inside a frustoconical wall 192, with a clearance between the toothings 193, 143.

The frustoconical wheel 144 is driven by a shaft 147 extending along axis Z, said shaft being itself driven by the reduction gear 149.

The frustoconical wheel 144 is maintained inside the frustoconical wall 143 by the above mentioned tabs 188.

The frustoconical wheel 144 may be either metallic or molded out of plastic material, for instance out of polyoxymethylene, e.g. out of Delrin®.

As shown on FIG. 45, the electric motor 148 may be fed by rechargeable batteries 150 and the lower portion 184 of the housing may be adapted to fit on a charging base 153 similar to the charging base already described with regard to the ninth embodiment of the invention, in order to charge the batteries 150 (see FIG. 42). In the eleventh embodiment of the invention as shown on FIG. 42, the charging base only distinguishes from that of FIG. 32 in that the electrical contacts 151 are located on the inner surface of the lateral wall 155 of the charging base, the lower portion 184 having electrical contact 151 similar to those of FIG. 45, but located in correspondence with the lateral electrical contact of FIG. 42 (the electrical contacts of the eleventh embodiment could also be disposed as those of the ninth embodiment).

As shown on FIGS. 42 and 43, the grinding system further includes a disposable reload cartridge 3 which may include a blister 194 of plastic material which is closed by a planar foil 198 which may seal tightly or not the internal volume of the cartridge 3 and thus forms the closure member of the cartridge. The foil 198 may be a metallic foil, a plastic foil or a multilayer foil.

The blister 194 may include a recess forming a tank 195 for the material 37 to be ground, and a planar peripheral edge 196 which surrounds said tank 195. The foil 198 is adhered on said planar edge 196, opposite the tank 195. The tank 195 may form a lower converging portion 197 which converges downward, thus forming a hoper, and the planar edge 196 may form a lower tip 196a.

At said lower tip 196a, the foil 198 may be folded upward, thus forming a fold 199.

Thus, when a new cartridge 3 has do be loaded in the grinding mill 2, the cover 181 is turned so that its opening 183 be in register with the slide 178 and the cartridge 3 is inserted in said slide 178 in the direction of arrow 200 (FIGS. 42 and 44). During this movement, the two rectilinear lateral sides 196b of the peripheral edge 196 slide in the slots 179 downwardly, and the stop 181 interferes with the lower portion of the foil 198 (namely the fold 199 in the present case) so that the lower portion of the foil 198 is opened by separation of said foil from the peripheral edge 196 of the blister and/or by tearing.

Figure 46:
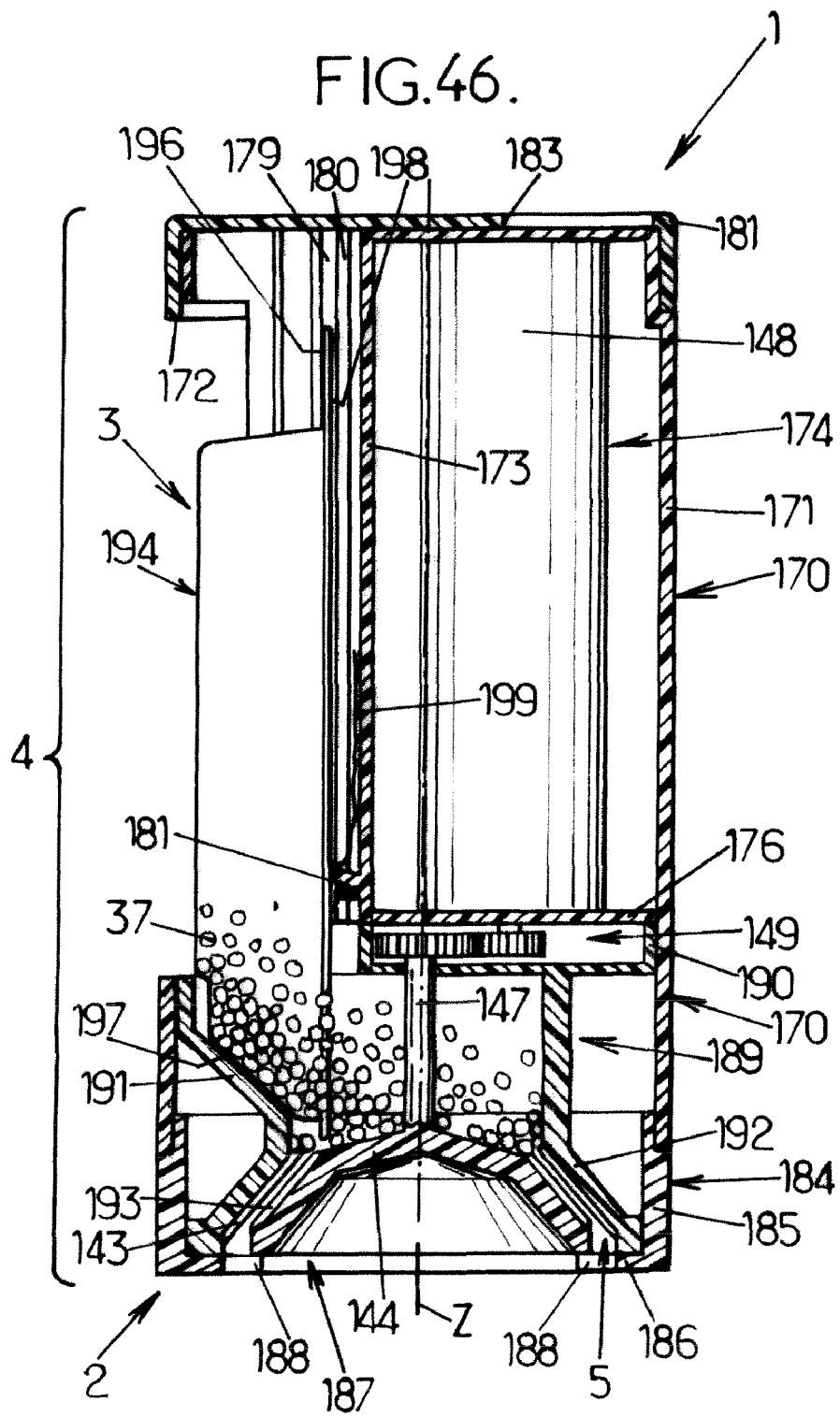
FIG. 46 is a section view similar to FIG. 44, showing the grinding system after insertion of the cartridge in the grinding mill.

Thus, the material 37 contained in the cartridge 3 may flow in the hoper 191 toward the grinding mechanism 5, as shown on FIG. 46.

Once the cartridge 3 has been so coupled to the grinding mill 2, the cover 181 may be turned so that the opening 182 covers the slide 178.

The material 37 may then be ground by actuating the button 158 (FIG. 42) to actuate the motor 148 and the grinding mechanism 5.

It should be noted that many variants of the above embodiments are possible. In particular, the closure member(s) which close(s) the cartridge before mounting thereof on the grinding mill:

may seal the cartridge tightly or not before mounting of the cartridge on the grinding mill, may be completely separated or not from the external wall of the cartridge when said closure members are open, may be displaced inside the cartridge or outside when said closure members are open.

Besides, it should be noted that in the embodiments described above, the closure member which initially closes the cartridge, is irreversibly opened when the cartridge is mounted on the grinding mill and/or positively maintained in the open position by the opening member as long as the cartridge remains mounted on the grinding mill. Therefore, the use of the grinding system is simplified, and the user does not have to care about opening or closing the closure member once the cartridge is mounted on the grinding mill.

In still another variant of the invention, the cartridge 3 might include the grinding mechanism 5 which would be connected to an actuating mechanism of the grinder 2 when the cartridge 3 is coupled to the grinder and the closure member of the cartridge is opened.

Another embodiment of the present invention includes a method for distributing a material to be ground. Preferably, the material to ground is a particle, grain, flake, or granule of a solid material, such as a spice, coffee, or sugar. In this method a material to be ground is provided in a disposable cartridge having a closure member and defining an internal volume adapted to contain the material to be ground. As discussed above with respect to the illustrative embodiments, the closure member is opened as a direct result of coupling the disposable cartridge to a grinding unit comprising a grinding mechanism. When the closure member is opened, the material to be ground accesses the grinding mechanism and can be ground by a user in accordance with the design of the grinding unit. In this way, a user can remove the disposable cartridge from the grinding unit and replace it with another disposable cartridge. Replacement can occur, for example, when the original disposable cartridge is empty or near-empty, or when the user desires to change the material to be ground.

Yet another embodiment of the present invention includes a method for selling a material to be ground. In this method a reusable grinding unit having a grinding mechanism is provided to a potential customer of the material to be ground. It is envisioned that providing the reusable grinding unit can be by sale or by promotion. Next, the material to be ground is sold to a customer in a disposable cartridge having a closure member and defining an internal volume adapted to contain the material to be ground. As discussed above with respect to the illustrative embodiments, the closure member is opened as a direct result of coupling the disposable cartridge to a grinding unit comprising a grinding mechanism. When the closure member is opened, the material to be ground accesses the grinding mechanism and can be ground by a user in accordance with the design of the grinding unit. Subsequent disposable cartridges containing one or more materials to be ground can then be sold to the potential customer, wherein the disposable cartridge is removable from the grinding unit and is replaced with another disposable cartridge.

All of the apparatus and/or methods disclosed and claimed herein can be made and executed without undue experimentation in light of the present disclosure. While the apparatus and methods of this invention have been described in terms of preferred and illustrative embodiments, it will be apparent to those of skill in the art that variations may be applied to the apparatus and/or methods and/or in the sequence of the steps of the methods described herein without departing from the concept and scope of the invention. All such similar variations and modifications apparent to those skilled in the art are deemed to be within the scope and concept of the present invention.

The invention claimed is:

1. Grinding system comprising:
a grinding mill including a housing and a grinding mechanism which is mounted in said housing and which is adapted to grind particles of a material,
a reload cartridge adapted to be removably coupled to said grinding mill, said cartridge defining an internal volume which is adapted to contain said material to be ground, said cartridge having at least one closure member which is adapted to close said internal volume before said cartridge is coupled to said grinding mill and to open toward said grinding mechanism when said cartridge is coupled to said grinding mill, wherein the grinding mill includes an opening member which is adapted to open said closure member when said cartridge is coupled to the grinding mill, and wherein the closure member is such that opening of said closure member is irreversible.

2. Grinding system as claimed in claim 1, wherein the opening member is adapted to interfere with said closure member to open said closure member when said cartridge is coupled to the grinding mill.

3. Grinding system as claimed in claim 1, wherein the cartridge is adapted to be coupled to the grinding mill following a certain coupling movement, and the opening member is adapted to open the closure member when the cartridge follows said coupling movement.

4. Grinding system as claimed in claim 1, wherein the closure member is adapted to seal tightly the cartridge.

5. Grinding system as claimed in claim 1, wherein the closure member is at least partially frangible and said opening member is adapted to break said closure member when said cartridge is coupled to the grinding mill.

6. Grinding system as claimed in claim 5, wherein the opening member protrudes from a portion of the grinding mill and said opening member is adapted to push on said closure member toward the internal volume of the cartridge and break said closure member when the cartridge is coupled to the grinding mill.

7. Grinding system as claimed in claim 1, wherein the grinding mill includes an electric motor for driving the grinding mechanism and means for disabling operation of said electric motor unless a cartridge is coupled to the grinding mill.

8. Grinding system according to claim 1, wherein the closure member is a foil and the opening member is adapted to interfere tangentially with said foil to open it when the cartridge is coupled to the grinding mill.

9. Grinding system according to claim 8, wherein the cartridge is adapted to be coupled to the grinding mill following a certain coupling movement and the opening member is adapted to interfere tangentially with the foil when the cartridge follows said coupling movement, and wherein the cartridge includes a blister and said foil is adhered to the blister.

10. Grinding system according to claim 8 or claim 9, wherein the opening member is adapted to either separate the foil from the blister, or tear the foil when the cartridge is coupled to the grinding mill.

11. Grinding system according to claim 1, wherein the cartridge contains an alimentary material to be ground.

12. Reload cartridge adapted to be removably coupled to a grinding mill including a housing and a grinding mechanism, said cartridge defining an internal volume which is adapted to contain particles of a material to be ground, said cartridge having at least one closure member which is adapted to close said internal volume before said cartridge is coupled to said grinding mill and to open toward said grinding mechanism when said cartridge is coupled to said grinding mill,
   wherein said closure member is adapted to be opened by an opening member of the grinding mill when said cartridge is coupled to the grinding mill, and wherein said closure member is such that opening of said closure member is irreversible.

13. A method for distributing a material to be ground, comprising:
   providing a material to be ground in a disposable cartridge defining an internal volume adapted to contain the material to be ground and comprising a closure member;
   wherein the closure member is irreversibly opened as a direct result of coupling the disposable cartridge to a grinding unit comprising a grinding mechanism;
   wherein opening the closure member allows the material to be ground to access the grinding mechanism.

14. The method of claim 13, wherein the grinding unit is reusable.

15. The method of claim 13, wherein the disposable cartridge is removable from the grinding unit and can be replaced with another disposable cartridge.

16. The method of claim 13, wherein the closure member is at least partially ruptured when opened.

17. The method of claim 13, wherein the material to be ground is a particle, grain, flake, or granule of a solid material.

18. The method of claim 13, wherein the material to be ground is selected from:
   a spice,
   coffee,
   and sugar.

19. A method for grinding a material, comprising:
   providing a reusable grinding unit comprising a grinding mechanism; and
   coupling a disposable cartridge containing the material to be ground to the reusable grinding unit;
   wherein the disposable cartridge comprises a closure member for containing the material to be ground; and
   wherein the closure member is irreversibly opened as a direct result of coupling the disposable cartridge to the grinding unit thereby allowing the material to be ground to access the grinding mechanism.

20. A grinding system, comprising:
   reusable means for grinding a material to be ground;
   disposable means for containing the material to be ground; and
   means for coupling the disposable containing means to the reusable grinding means and irreversibly opening said disposable means such that the material to be ground accesses the grinding means.

* * * * *